US011602006B2

(12) United States Patent
Balasubramanian et al.

(10) Patent No.: US 11,602,006 B2
(45) Date of Patent: Mar. 7, 2023

(54) TRANSMISSION MODE CYCLE ALIGNMENT

(71) Applicant: QUALCOMM Incorporated, San Diego, CA (US)

(72) Inventors: Anantharaman Balasubramanian, San Diego, CA (US); Kapil Gulati, Belle Mead, NJ (US); Sudhir Kumar Baghel, Hillsborough, NJ (US); Shuanshuan Wu, San Diego, CA (US); Gabi Sarkis, San Diego, CA (US); Tien Viet Nguyen, Bridgewater, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/147,738

(22) Filed: Jan. 13, 2021

(65) Prior Publication Data

US 2021/0227619 A1    Jul. 22, 2021

Related U.S. Application Data

(60) Provisional application No. 62/962,861, filed on Jan. 17, 2020.

(51) Int. Cl.
*H04W 76/28* (2018.01)
*H04W 4/40* (2018.01)
*H04W 4/70* (2018.01)
*H04W 88/02* (2009.01)
*H04W 52/02* (2009.01)

(52) U.S. Cl.
CPC ............. *H04W 76/28* (2018.02); *H04W 4/40* (2018.02); *H04W 88/02* (2013.01)

(58) Field of Classification Search
CPC ....... H04W 76/28; H04W 4/40; H04W 88/02; H04W 4/70; H04W 52/0216; Y02D 30/70
USPC .......................................................... 370/328
See application file for complete search history.

(56) References Cited

U.S. PATENT DOCUMENTS

| 9,894,661 | B2 * | 2/2018 | Worrall ............... H04W 72/048 |
| 2010/0262690 | A1 * | 10/2010 | Jokinen .................. H04W 4/16 |
| | | | 709/224 |
| 2011/0199951 | A1 | 8/2011 | Kwon et al. |

(Continued)

OTHER PUBLICATIONS

International Search Report and Written Opinion—PCT/US2021/013368—ISA/EPO—dated May 6, 2021.

*Primary Examiner* — Inder P Mehra
(74) *Attorney, Agent, or Firm* — Holland & Hart LLP

(57) ABSTRACT

Methods, systems, and devices for wireless communications are described. A user equipment (UE), may receive, at a processing layer of the UE, sets of discontinuous reception (DRX) cycle parameters from a corresponding set of applications at an application layer of the UE. The UE may determine, based on the sets of DRX parameters, a common DRX cycle to satisfy each of the sets of applications. The UE may transmit the common DRX cycle to one or more layers in the user plane protocol stack of the UE. A base station may also receive a request, from the UE, for a set of DRX cycle parameters that satisfies the common DRX cycle of the UE. The base station may transmit an indication of the set of DRX parameters, and receive, from the UE, a confirmation of a DRX cycle associated with the set of DRX cycle parameters.

28 Claims, 18 Drawing Sheets

(56) References Cited

U.S. PATENT DOCUMENTS

2014/0254451 A1* 9/2014 Jamadagni ........ H04W 52/0209
                                                         370/311
2014/0349694 A1* 11/2014 Raghothaman ....... H04W 76/14
                                                         455/509

* cited by examiner

TRANSMISSION MODE CYCLE ALIGNMENT

CROSS REFERENCE

The present Application for Patent claims the benefit of U.S. Provisional patent Application No. 62/962,861 by BALASUBRAMANIAN et al., entitled "TRANSMISSION MODE CYCLE ALIGNMENT," filed Jan. 17, 2020, assigned to the assignee hereof, and expressly incorporated by reference in its entirety herein.

FIELD OF TECHNOLOGY

The following relates generally to wireless communications and more specifically to transmission mode cycle alignment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may utilize a wake-up cycle, such as a discontinuous reception (DRX) cycle, in order to periodically monitor communication channels. In some cases, a UE may communicate on one or more radio access technologies (RATs) (e.g., NR or LTE), or using one or more communication types, such as unicast or broadcast. Each communication in each RAT or each different application type may include operations on different wake-up cycles. This may result in a UE operating in an always-on or similar mode, which may decrease the power and efficiency of the UE.

SUMMARY

The described techniques relate to improved methods, systems, devices, and apparatuses that support transmission mode cycle alignment. Generally, the described techniques provide for a user equipment (UE), for example in a vehicle-to-everything (V2X) communication system, to determine a common discontinuous reception (DRX) cycle. The UE may receive, at a processing layer of the UE, sets of DRX cycle parameters from a corresponding set of applications at an application layer of the UE. The processing layer may be below the application layer and above a user plane protocol stack of the UE. The UE may determine, based on the sets of DRX cycle parameters, a common DRX cycle to satisfy each of the set of applications. The UE may transmit the common DRX cycle to one or more layers in the user plane protocol stack of the UE.

Further, a base station in communication with the UE may receive a request, from the UE, for a set of DRX cycle parameters that satisfies the common DRX cycle of the UE. The base station may transmit, to the UE, a confirmation of a DRX cycle associated with the set of DRX cycle parameters. The base station may receive, from the UE, a confirmation of a DRX cycle associated with the set of DRX parameters.

A method of wireless communications at a UE is described. The method may include receiving, at a processing layer of the UE, a set of sets of DRX cycle parameters from a corresponding set of applications at an application layer of the UE, where the processing layer is below the application layer and above a user plane protocol stack of the UE, determining, based on the set of sets of DRX cycle parameters, a common DRX cycle to satisfy each of the set of applications, and transmitting the common DRX cycle to one or more layers in the user plane protocol stack of the UE.

An apparatus for wireless communications at a UE is described. The apparatus may include a processor, memory coupled with the processor, and instructions stored in the memory. The instructions may be executable by the processor to cause the apparatus to receive, at a processing layer of the UE, a set of sets of DRX cycle parameters from a corresponding set of applications at an application layer of the UE, where the processing layer is below the application layer and above a user plane protocol stack of the UE, determine, based on the set of sets of DRX cycle parameters, a common DRX cycle to satisfy each of the set of applications, and transmit the common DRX cycle to one or more layers in the user plane protocol stack of the UE.

Another apparatus for wireless communications at a UE is described. The apparatus may include means for receiving, at a processing layer of the UE, a set of sets of DRX cycle parameters from a corresponding set of applications at an application layer of the UE, where the processing layer is below the application layer and above a user plane protocol stack of the UE, determining, based on the set of sets of DRX cycle parameters, a common DRX cycle to satisfy each of the set of applications, and transmitting the common DRX cycle to one or more layers in the user plane protocol stack of the UE.

A non-transitory computer-readable medium storing code for wireless communications at a UE is described. The code may include instructions executable by a processor to receive, at a processing layer of the UE, a set of sets of DRX cycle parameters from a corresponding set of applications at an application layer of the UE, where the processing layer is below the application layer and above a user plane protocol stack of the UE, determine, based on the set of sets of DRX cycle parameters, a common DRX cycle to satisfy each of the set of applications, and transmit the common DRX cycle to one or more layers in the user plane protocol stack of the UE.

A method of wireless communications at a base station is described. The method may include receiving a request, from a UE, for a set of DRX cycle parameters that satisfies a common DRX cycle of the UE, transmitting, to the UE, an indication of the set of DRX cycle parameters in response to the request, and receiving, from the UE, a confirmation of a DRX cycle associated with the set of DRX cycle parameters.

An apparatus for wireless communications at a base station is described. The apparatus may include a processor, memory coupled with the processor, and instructions stored in the memory. The instructions may be executable by the processor to cause the apparatus to receive a request, from a UE, for a set of DRX cycle parameters that satisfies a common DRX cycle of the UE, transmit, to the UE, an indication of the set of DRX cycle parameters in response to the request, and receive, from the UE, a confirmation of a DRX cycle associated with the set of DRX cycle parameters.

Another apparatus for wireless communications at a base station is described. The apparatus may include means for receiving a request, from a UE, for a set of DRX cycle parameters that satisfies a common DRX cycle of the UE, transmitting, to the UE, an indication of the set of DRX cycle parameters in response to the request, and receiving, from the UE, a confirmation of a DRX cycle associated with the set of DRX cycle parameters.

A non-transitory computer-readable medium storing code for wireless communications at a base station is described. The code may include instructions executable by a processor to receive a request, from a UE, for a set of DRX cycle parameters that satisfies a common DRX cycle of the UE, transmit, to the UE, an indication of the set of DRX cycle parameters in response to the request, and receive, from the UE, a confirmation of a DRX cycle associated with the set of DRX cycle parameters.

DETAILED DESCRIPTION

Figure 1:
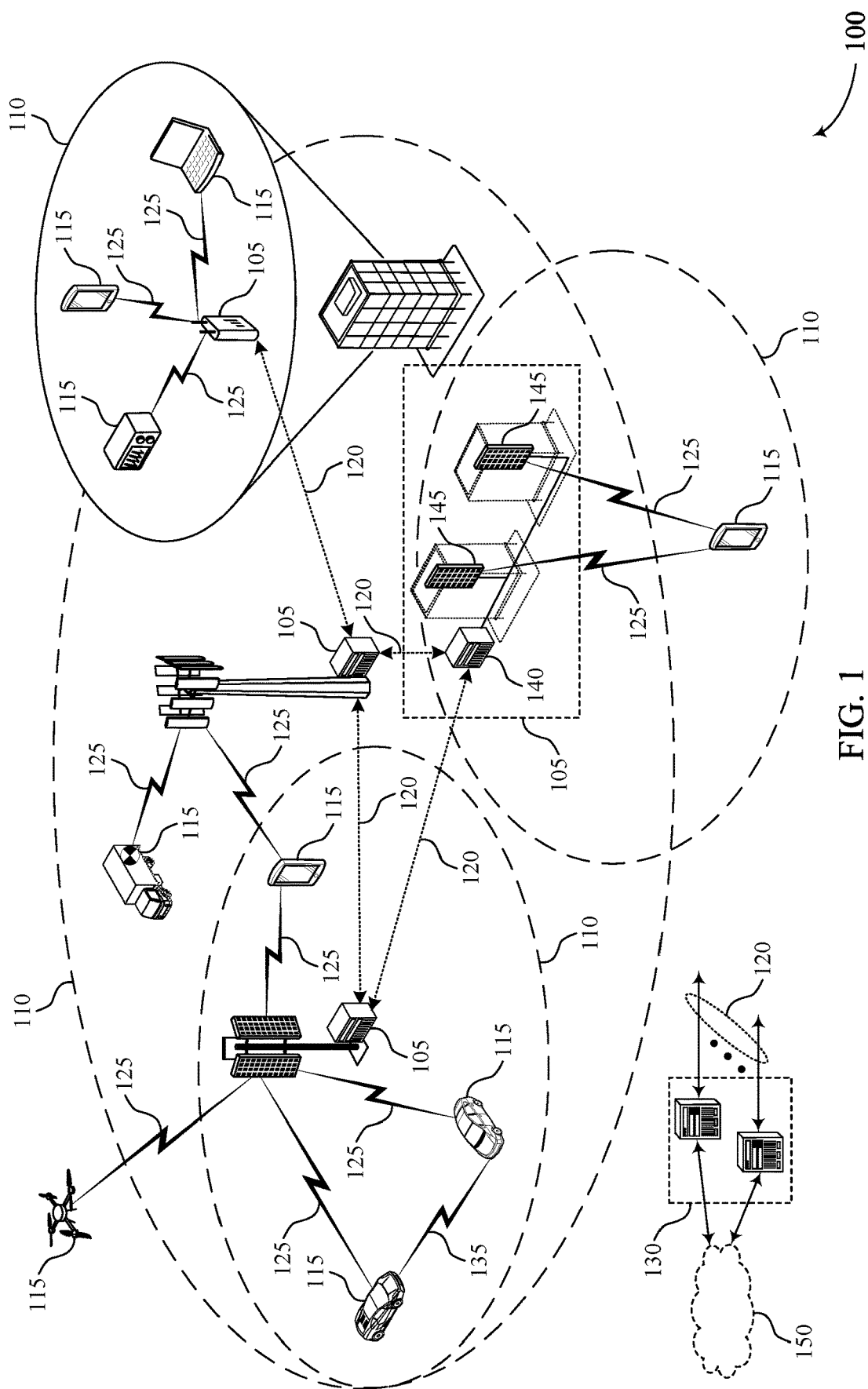
FIG. 1 illustrates an example of a wireless communications system that supports transmission mode cycle alignment in accordance with aspects of the present disclosure.

A user equipment (UE) may use wake-up cycles, such as a discontinuous reception (DRX) cycle to periodically monitor a channel during the wake-up period. The monitoring of the channel may include transmitting and receiving signals during the wake-up period. In other periods the UE may be in a low power or a sleep mode. The UE may therefore save power by periodically monitoring communications, rather than operating in an always-on mode.

The UE may communicate in a vehicle-to-everything (V2X) communications system (which may be an example of sidelink communications), or communicate directly with a base station. The UE may further communicate according to different radio access technologies (RATs) or according to different schemes, such as unicast, groupcast, multicast, or broadcast. A UE may be configured with different DRX cycles for communication on different RATs, and may also have different DRX cycles between unicast and broadcast communications. The UE may also have a configured DRX scheme for V2X communications, and a configured DRX scheme for uplink and downlink communications with a base station.

As such, the UE may monitor communications channels according to each configured DRX cycle, and in some cases each DRX cycle may have a different periodicity or wake-up length. As such, a UE may continually be in an ON mode because of the unaligned DRX cycles that the UE is attempting to satisfy. Even if the UE is able to enter a sleep or low power mode, the total ON duration for the UE may result in extended monitoring periods. This extended monitoring due to DRX cycle configurations may therefore decrease UE power and efficiency, as the UE no longer operates with the power-saving benefits of a DRX cycle.

Further, if multiple UEs in a system have aligned DRX cycles, there may be congestion, as each UE may access communication channels at the same time, and there may be periods where few or no UEs access the channel. This may lead to further inefficiencies.

A UE may therefore individually determine a common DRX cycle for the different applications of the UE, such as sidelink or V2X communications, and sidelink communications on different RATs. The common DRX cycle may allow all applications of the UE to wake-up for the same or overlapping periods, which may save power at the UE and more efficiently utilize resources. Further, the UE may also align the common DRX cycle for sidelink communications with the DRX cycle for communications with a base station. Therefore, the base station may have information about the common DRX cycle of each UE used for sidelink in a system, and align the base station and UE DRX cycle (e.g., a Uu DRX cycle) for each UE to efficiently utilize the uplink, downlink, and sidelink resources in a system, to further reduce congestion.

Aspects of the disclosure are initially described in the context of wireless communications systems. Aspects of the disclosure are then described in the context of protocol stacks and process flows. Aspects of the disclosure are further illustrated by and described with reference to apparatus diagrams, system diagrams, and flowcharts that relate to transmission mode cycle alignment.

FIG. 1 illustrates an example of a wireless communications system 100 that supports transmission mode cycle alignment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical (PHY) layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115, for example in a V2X communication system, may determine a common DRX cycle. The UE 115 may receive, at a processing layer of the UE 115, sets of DRX cycle parameters from a corresponding set of applications at an application layer of the UE 115. The processing layer may be below the application layer and above a user plane protocol stack of the UE. The UE 115 may determine, based on the sets of DRX cycle parameters, a common DRX cycle to satisfy each of the set of applications. The UE 115 may transmit the common DRX cycle to one or more layers in the user plane protocol stack of the UE.

Further, a base station 105 in communication with the UE 115 may receive a request, from the UE 115, for a set of DRX cycle parameters that satisfies the common DRX cycle of the UE 115. The base station 105 may transmit, to the UE 115, a confirmation of a DRX cycle associated with the set of DRX cycle parameters. The base station 105 may receive, from the UE 115, a confirmation of a DRX cycle associated with the set of DRX parameters.

Figure 2:
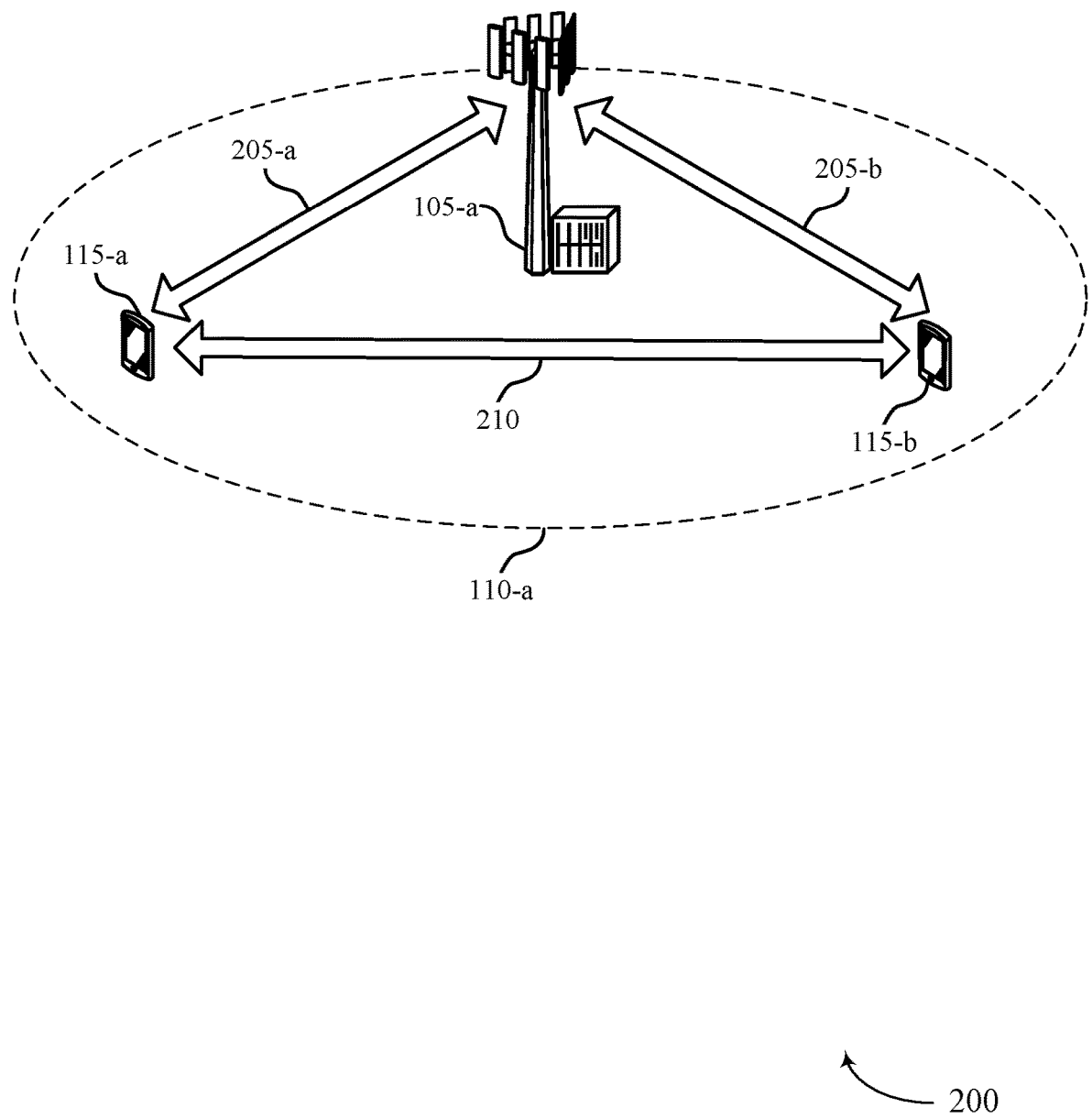
FIG. 2 illustrates an example of a wireless communications system that supports transmission mode cycle alignment in accordance with aspects of the present disclosure.

FIG. 2 illustrates an example of a wireless communications system 200 that supports transmission mode cycle alignment in accordance with aspects of the present disclosure. In some examples, wireless communications system 200 may implement aspects of wireless communication system 100. Base station 105-a may be an example of base stations 105 as described with reference to FIG. 1. UEs 115-a and 115-b may be examples of UEs 115 as described with reference to FIG. 1. Base station 105-a may serve one or more UEs 115, including UE 115-a and 115-b within coverage areas 110-a. Base station 105-a may communicate with UE 115-a over communication link 205-a, and base station 105-a may also communicate with UE 115-b over communication link 205-b. Further, UEs 115-a and 115-b may communicate over sidelink 210. For example, UE 115-a and UE 115-b may be vehicles within a V2X wireless communication system.

UE 115-a may monitor both communication link 205-a and sidelink 210 based on one or more DRX cycles. For example, UE 115-a may operate on a first DRX cycle to monitor communication link 205-a, and a second DRX cycle to monitor sidelink 210. UE 115-a may also operate based on other DRX cycles to operate according to different RATs (e.g., LTE or NR) or also may use different DRX cycles to communicate based on different RATs over communication link 205-a or sidelink 210.

UE 115-a may determine a common DRX cycle based on which to monitor (e.g., transmit and receive) on sidelink 210 with UE 115-b. UE 115-a may determine the common DRX cycle based on a negotiation within UE 115-*a*. For example, a processing layer of UE 115-*a* may negotiate with other layers of UE 115-*a*, such as applications in an application layer, to determine a common DRX cycle. UE 115-*a* may use the common DRX cycle to monitor sidelink 210. UE 115-*a* may use the common DRX cycle to monitor communications of different RATs, as well as transmit and receive unicast and broadcast communications. The common DRX cycle may allow UE 115-*a* to more efficiently operate during wake-up times, rather than being in an always-on mode.

Further, UE 115-*a* may communicate with base station 105-*a* over communication link 205-*a* to determine a Uu DRX cycle. A Uu DRX cycle may be a DRX cycle for communications between a base station 105 and a UE 115. For example, UE 115-*a* may use a Uu DRX cycle to determine when to monitor communication link 205-*a*, including transmitting and receiving messages to and from base station 105-*a*. In some cases, base station 105-*a* may configure UE 115-*a* with a Uu DRX cycle. In some cases, base station 105-*a* may not configure UE 115-*a* with a Uu DRX cycle.

In cases where base station 105-*a* configures UE 115-*a* with a Uu DRX cycle, UE 115-*a* may either use the Uu DRX cycle to determine the common DRX cycle, or UE 115-*a* may determine the common DRX cycle, and may request that the Uu DRX cycle configured by base station 105-*a* matches the common DRX cycle.

For example, UE 115-*a* may determine a common DRX cycle. UE 115-*a* may transmit, to base station 105-*a*, an indication of the common DRX cycle, or an indication of parameters of the common DRX cycle. Base station 105-*a* may determine a Uu DRX cycle based on the indication or parameters, and may transmit an indication of the Uu DRX cycle to UE 115-*a* over communication link 205-*a*. UE 115-*a* may accept the Uu DRX cycle, and may transmit an indication of the confirmation of the Uu DRX cycle to base station 105-*a*. UE 115-*a* may use the Uu DRX cycle to communicate with base station 105-*a* over communication link 205-*a*.

Further, base station 105-*a* may determine the Uu DRX cycle such that communications with other UEs 115 are not interrupted, or so that interference between UEs 115 may be decreased. For example, UE 115-*b* may also be configured with a Uu DRX cycle, or may request an updated Uu DRX cycle. Base station 105-*a* may determine a Uu DRX cycle for UE 115-*a* and a Uu DRX cycle for UE 115-*b* such that each UE 115 has different Uu DRX cycles, and are therefore unlikely to transmit and receive communications at similar times, thus decreasing interference and improving communication reliability at UE 115-*a* and UE 115-*b*.

Figure 3:
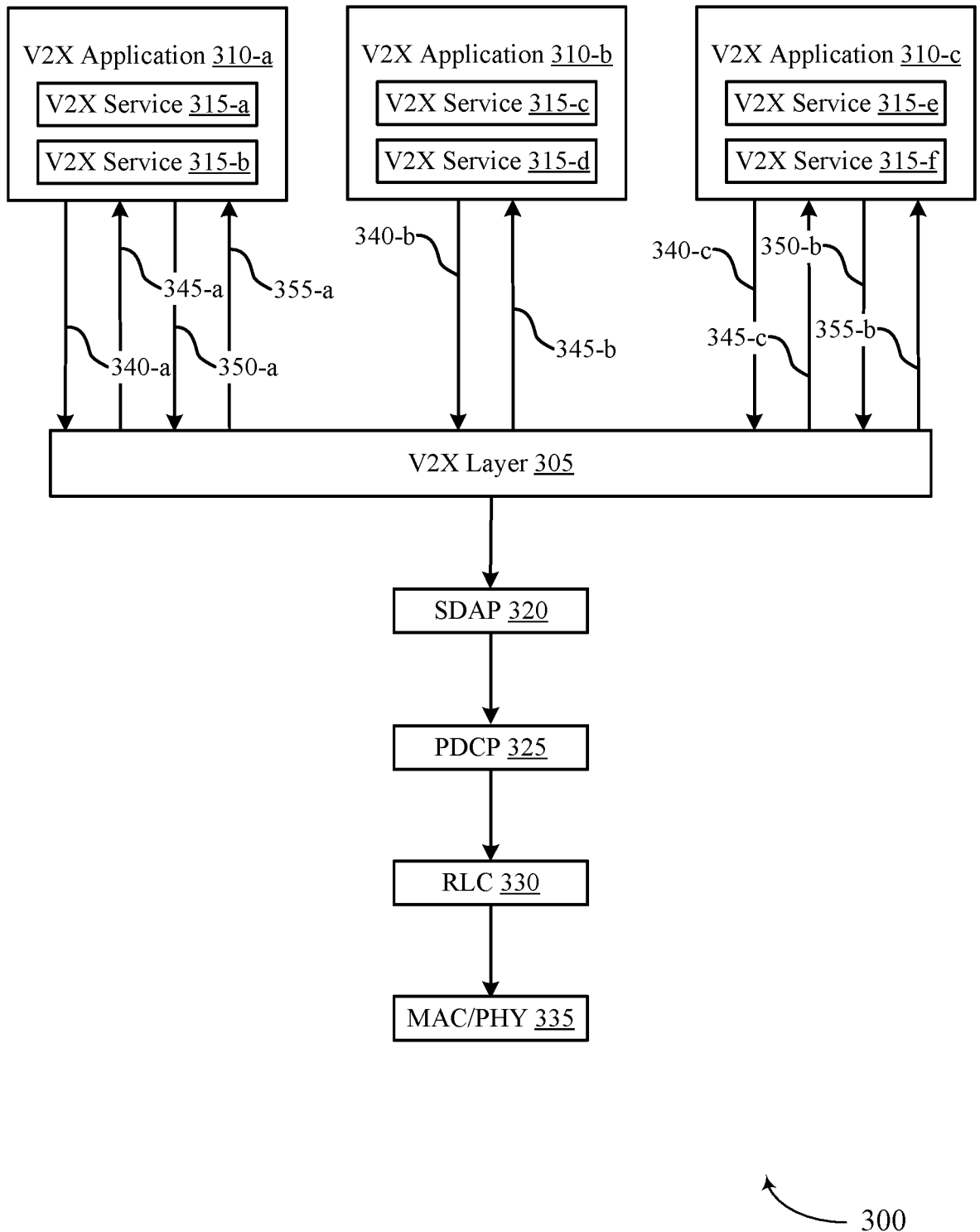
FIGS. 3 and 4 illustrate examples of protocol stacks that support transmission mode cycle alignment in accordance with aspects of the present disclosure.

FIG. 3 illustrates an example of a protocol stack 300 that supports transmission mode cycle alignment in accordance with aspects of the present disclosure. In some examples, protocol stack 300 may implement aspects of wireless communication systems 100 and 200. Protocol stack 300 may include components within a UE 115 as described with reference to FIGS. 1 and 2. Protocol stack 300 may include V2X layer 305, multiple V2X applications 310, each including V2X services 315. V2X layer 305 may communicate with V2X applications 310. Protocol stack may also include service data adaptation protocol (SDAP) 320, PDCP 325, RLC 330, and MAC/PHY 335. Each of SDAP 320, PDCP 325, RLC 330, and MAC/PHY 335 may be included in the user plan protocol stack of a UE 115. In some cases, MAC/PHY 335 may be separated into different layers.

In order to determine a common DRX cycle for sidelink communications, V2X layer 305 (e.g., a processing layer) of a UE 115 may negotiate the common DRX cycle with one or more of V2X applications 310 (e.g., application layers) of the UE 115. Each V2X service 315 may operate according to different DRX cycles, in cases where each V2X service of an application 310 operates on a different RAT or according to a different communication configuration.

For example, V2X service 315-*a* may communicate on a first RAT (e.g., LTE), and V2X service 315-*b* may communicate on a second RAT (e.g., NR). V2X service 315-*a* and V2X service 315-*b* may therefore have differing service requirements for corresponding DRX cycles. In another example, V2X service 315-*c* may communicate in a unicast configuration, and V2X service 315-*d* may communicate in a multicast configuration. V2X service 315-*c* and V2X service 315-*d* may also have differing service requirements leading to different DRX cycles, which may also differ from the DRX cycles of V2X services 315-*a*, 315-*b*, 315-*e*, and 315-*f*.

A UE 115 may therefore determine a common DRX cycle between all application services to save battery and avoid extensive "on" periods resulting from the unsynchronized DRX cycles. The common DRX cycle may be determined to align with different communication parameters of each V2X application 310 of the UE 115. The common DRX cycle may maximize power saving efficiency and equitably distribute the channel load between each V2X application 310 of the UE 115.

Each V2X application 310 may be aware of its service requirements. The service requirements may include packet delay budget (PDB), reliability requirements, and other parameters. Each V2X application 310 may transmit a request, to V2X layer 305, for a DRX cycle to satisfy the service requirements of each V2X application 310. The request may be transmitted in message 340. For example, V2X application 310-*a* may transmit a message 340-*a* including an indication of service requirements and a request for a DRX cycle according to the service requirements. V2X applications 310-*b* and 310-*c* may transmit messages 340-*b* and 340-*c* respectively, indicating service requirements.

V2X layer 305 may assimilate the service requirements and DRX cycle requests from each of V2X applications 310-*a*, 310-*b*, and 310-*c* (or more), and may determine a common DRX cycle that is amenable to each V2X application 310. V2X layer 305 may then request for V2X applications 310 to update the corresponding DRX cycle in message 345. For example, V2X application 310-*b* may already use the determined common DRX cycle, but V2X applications 310-*a* and 310-*c* may use different DRX cycles. Thus, V2X layer 305 may request for V2X application 310-*a* and 310-*c* to update their DRX cycles. V2X layer 305 may transmit the request to change the DRX cycle of applications 310-*a* and 310-*b* in message 345-*a* and 345-*b*, respectively. In the example where V2X application 310-*b* is already using the common DRX cycle, V2X layer 305 may transmit a confirmation of the common DRX cycle in message 345-*b*.

Each V2X application 310 that receives a request in a message 345 from V2X layer 305 to update its DRX cycle may respond to the feasibility of the request by transmitting a response in a message 350 to V2X layer 305. For example, V2X applications 310-*a* and 310-*c* may transmit feasibility response messages 350-*a* and 350-*b*, respectively, to V2X layer 305. V2X layer 305 may then confirm the common DRX cycle to follow for each of V2X applications 310-*a* and 310-*c* by transmitting confirmation messages 355-*a* and 355-*b* respectively. This confirmation may enable each V2X application 310-*a* and 310-*c* to determine the rate and periodicity at which to generated V2X data packets, for sidelink transmissions to other UEs 115. V2X application 310-b may also determine the rate and periodicity of generated V2X packets based on confirmation message 345-b. V2X layer 305 may also transmit an indication of the common DRX cycle to lower layers SDAP 320, PDCP 325, RLC 330, and MAC/PHY 335. The UE 115 may then communicate over sidelinks to other UEs 115 using the common DRX cycle.

Figure 4:
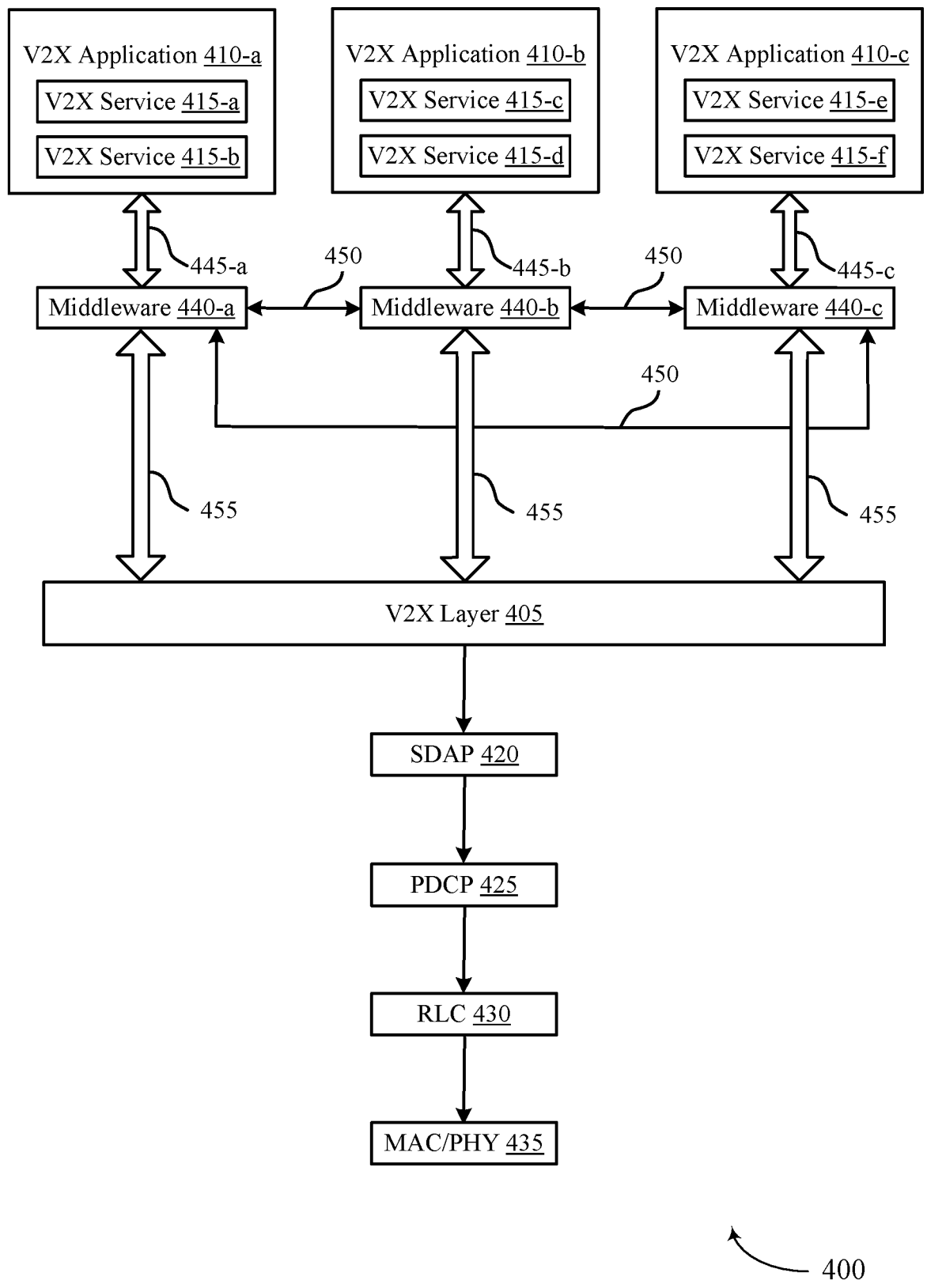

FIG. 4 illustrates an example of a protocol stack 400 that supports transmission mode cycle alignment in accordance with aspects of the present disclosure. In some examples, protocol stack 400 may implement aspects of wireless communication systems 100 and 200. Protocol stack 400 may include components within a UE 115 as described with reference to FIGS. 1 and 2. Protocol stack 400 may include V2X layer 405, multiple V2X applications 410, each including V2X services 415. V2X layer 405 may communicate with V2X applications 410 via middleware layers 440. Protocol stack may also include SDAP 420, PDCP 425, RLC 430, and MAC/PHY 435. Each of SDAP 420, PDCP 425, RLC 430, and MAC/PHY 435 may be included in the user plan protocol stack of a UE 115. In some cases, MAC/PHY 435 may be separated into different layers.

In order to determine a common DRX cycle for sidelink communications, in some cases each V2X application 410 may negotiate amongst themselves, rather than through V2X layer 405. Each V2X application 410 is aware of their own service requirements, and the service requirements of each V2X service 415.

Each V2X service 415 may operate according to different DRX cycles, in cases where each V2X service of an application 410 operates on a different RAT or according to a different communication configuration.

For example, V2X service 415-a may communicate on a first RAT (e.g., LTE), and V2X service 415-b may communicate on a second RAT (e.g., NR). V2X service 415-a and V2X service 415-b may therefore have differing service requirements for corresponding DRX cycles. In another example, V2X service 415-c may communicate in a unicast configuration, and V2X service 415-d may communicate in a multicast configuration. V2X service 415-c and V2X service 415-d may also have differing service requirements leading to different DRX cycles, which may also differ from the DRX cycles of V2X services 415-a, 415-b, 415-e, and 415-f.

Each V2X application 410 may therefore negotiate with all other V2X applications 410 to arrive at a common DRX cycle to maximize power saving efficiency by aligning the DRX cycles of each V2X service 415, while also equitably distributing channel load. Each V2X application 415 may then provide the determined common DRX cycle to the V2X layer 405. V2X layer 405, may confirm the common DRX cycle. V2X layer 405 may also pass down the determined common DRX cycle to the lower layers SDAP 420, PDCP 425, RLC 430, and MAC/PHY 435.

In some cases, the negotiation of the common DRX cycle between V2X applications 410 can occur with the use of middleware layers 440. In this case, each middleware layer may receive service requirements from the corresponding V2X application 410 in signaling 445. Middleware layer 440-a may receive service requirements from V2X application 410-a in signaling 445-a, middleware layer 440-b may receive service requirements from V2X application 410-b in signaling 445-b, and middleware layer 440-c may receive service requirements from V2X application 410-c in signaling 445-c. Middleware layers 440 may negotiate with other middleware layers 440 to determine the common DRX cycle. Middleware layers 440 may communicate with each other middleware layers 440 using signaling 450. Middleware layers 440 may transmit an indication of the common DRX cycle to V2X layer 405 in signaling 455. V2X layer 405 may then pass down the common DRX cycle to the lower layers SDAP 420, PDCP 425, RLC 430, and MAC/PHY 435.

A UE 115 may therefore determine a common DRX cycles between all application services to save battery and avoid extensive "on" periods resulting from the unsynchronized DRX cycles. The UE 115 may then communicate over sidelinks to other UEs 115 using the common DRX cycle.

Figure 5:
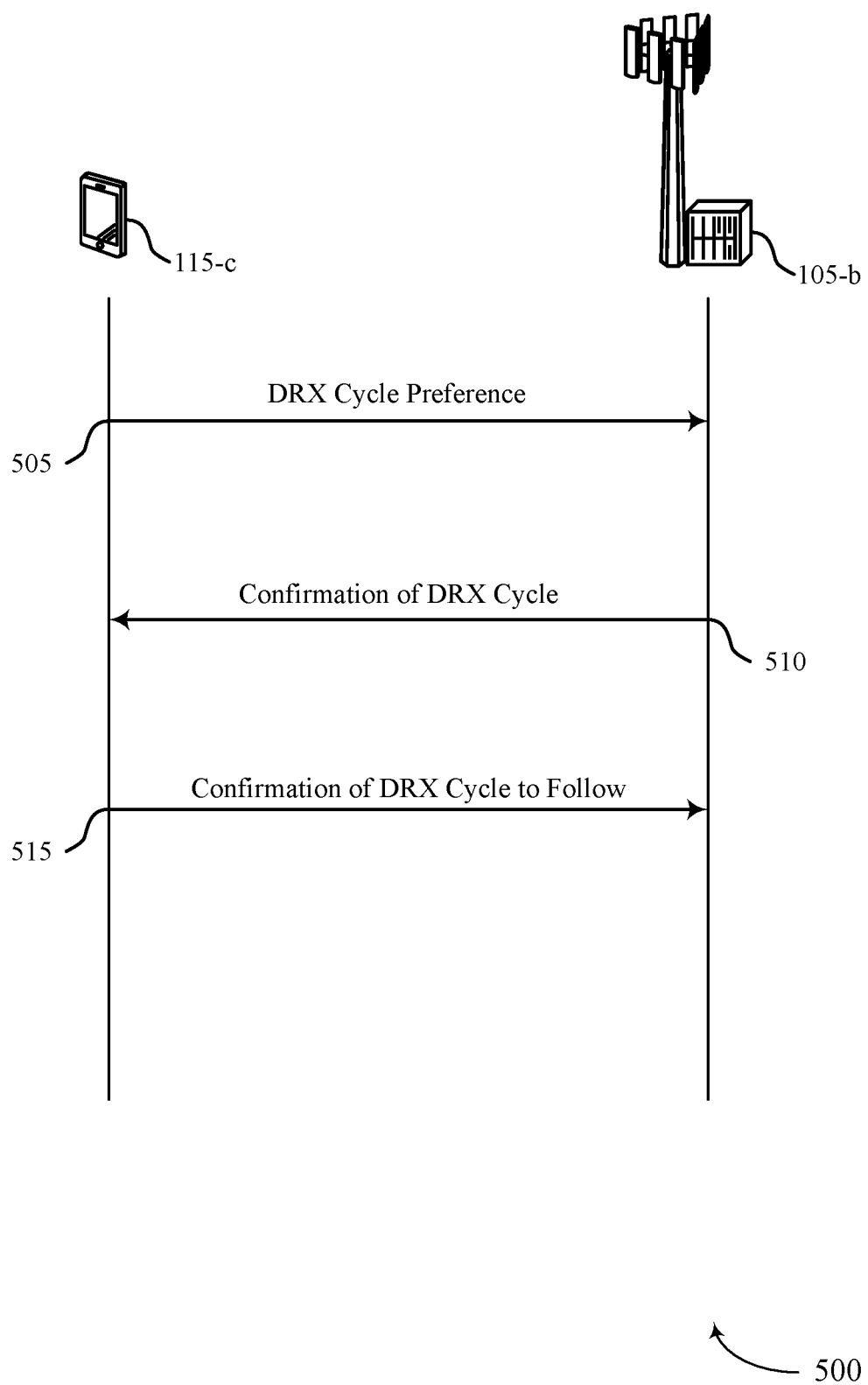
FIGS. 5 and 6 illustrate examples of process flows that support transmission mode cycle alignment in accordance with aspects of the present disclosure.

FIG. 5 illustrates an example of a process flow 500 that supports transmission mode cycle alignment in accordance with aspects of the present disclosure. In some examples, process flow 500 may implement aspects of wireless communication systems 100 and 200. Process flow 500 may include UE 115-c, which may be an example of a UE 115 as described with reference to FIGS. 1-4. Process flow 500 may also include base station 105-b, which may be an example of a base station 105 as described with reference to FIGS. 1 and 2. UE 115-c and base station 105-b may communicate over uplink and downlink communication links. UE 115-c may also communicate with other UEs 115 and other wireless devices over sidelinks, such as in a V2X communications system.

UE 115-c may determine to align a common DRX cycle with a DRX cycle for communications with base station 105-b. The DRX cycle for communications between UE 115-c and base station 105-b may be an example of a Uu DRX cycle, a DRX cycle for UE and base station communications. In some cases, base station 105-b may configure the Uu DRX cycle. For example, UE 115-c may receive an indication of an additional set of DRX cycle parameters from base station 105-b, where the additional set of DRX cycle parameters pertains to communications between UE 115-c and base station 105-b. UE 115-c may determine the common DRX cycle based on the indication.

In other cases, base station 105-b may not configure the Uu DRX cycle to UE 115-c. UE 115-c may be configured with a common DRX cycle. The common DRX cycle may be configured based on a common DRX cycle determination as described with reference to FIGS. 2-4 herein. UE 115-c may transmit, at 505, a request for a Uu DRX cycle to base station 105-b. Base station 105-b may receive, at 505, the request for the set of DRX parameters that satisfies a common DRX cycle of UE 115-c. The request for the Uu DRX cycle may be based on the common DRX cycle used for sidelink, and parameters associated with the common DRX cycle. The request for the Uu DRX cycle may be transmitted in a RRC Connection request.

For example, UE 115-c may include, in the request, a set of parameters. The parameters may include a sidelink traffic pattern or an explicit request for a particular DRX cycle. The parameters may also include an alignment indicator. The alignment indicator may indicate whether UE 115-c requests for the Uu DRX cycle to align with the common DRX cycle used for sidelink communications. In cases where UE 115-c sets the alignment indicator to true, base station 105-b may attempt to align the Uu DRX cycle with the indicated common DRX cycle of UE 115-c used for sidelink communications.

The parameters in the request may also include a flexibility indicator. The flexibility indicator may indicate whether UE 115-c is flexible in modifying the common DRX cycle of UE 115-c. In cases where UE 115-c sets the flexibility indicator to "true", UE 115-c may indicate that base station 105-*b* that base station 105-*b* does not have to strictly synchronize the Uu DRX cycle based on the common DRX cycle indicated by UE 115-*c*. Further, the flexibility indicator set to "true" may indicate that the common DRX cycle and the Uu DRX cycle determined by base station 105-*b* do not have to exactly overlap. If UE 115-*c* sets the flexibility indicator to "false", base station 105-*b* may provide a Uu DRX cycle to UE 115-*c* such that the Uu DRX cycle overlaps partially or exactly with the common DRX cycle.

For example, UE 115-*c* may also transmit, to base station 105-*b*, a request for an additional set of uplink DRX parameters that are satisfied by the common DRX cycle. This request may be transmitted in a RRC configuration request. The request may include the alignment indicator indicating whether an additional DRX cycle associated with the additional set of DRX parameters is to align with the common DRX cycle. The request may also include the flexibility indicator indicating whether UE 115-*c* is flexible in modifying the common DRX cycle. The request may also include an indication of a sidelink traffic pattern, an explicit indication of the common DRX cycle, or a combination of these.

Base station 105-*c* may then transmit, at 510, a confirmation of the Uu DRX cycle. Base station 105-*b* may transmit, to UE 115-*c*, an indication of the set of DRX cycle parameters in response to the request from UE 115-*c* at 505. The confirmation of the Uu DRX cycle may be transmitted in a RRC connection setup message.

In some cases, base station 105-*b* may have previously provided a Uu DRX cycle. In some cases, UE 115-*c* may take the Uu DRX cycle into account when determining a common DRX cycle used for sidelink. UE 115-*c* may determine a common DRX cycle such that it overlaps partially or exactly with the Uu DRX cycle. In other cases, UE 115-*c* may determine the common DRX cycle, and may transmit to base station 105-*b* a request for an updated Uu DRX cycle. The request may include an indication of the common DRX cycle determined by UE 115-*c*.

For example, UE 115-*c* may determine that the common DRX cycle does not satisfy the additional set of DRX parameters (e.g., defining the Uu DRX cycle). UE 115-*c* may then transmit a request, to base station 105-*b*, for an updated set of DRX cycle parameters that are satisfied by the common DRX cycle. The request may be transmitted in a RRC reconfiguration message.

At 515, UE 115-*c* may transmit a confirmation of the determined Uu DRX cycle. Base station 105-*b* may receive, from UE 115-*c*, a confirmation of a DRX cycle (e.g., Uu DRX cycle) associated with the set of DRX parameters. UE 115-*c* may then use the Uu DRX cycle to monitor the communication channel between UE 115-*c* and base station 105-*b*. UE 115-*c* may transmit and receive communications to and from base station 105-*b* based on the Uu DRX cycle.

Figure 6:
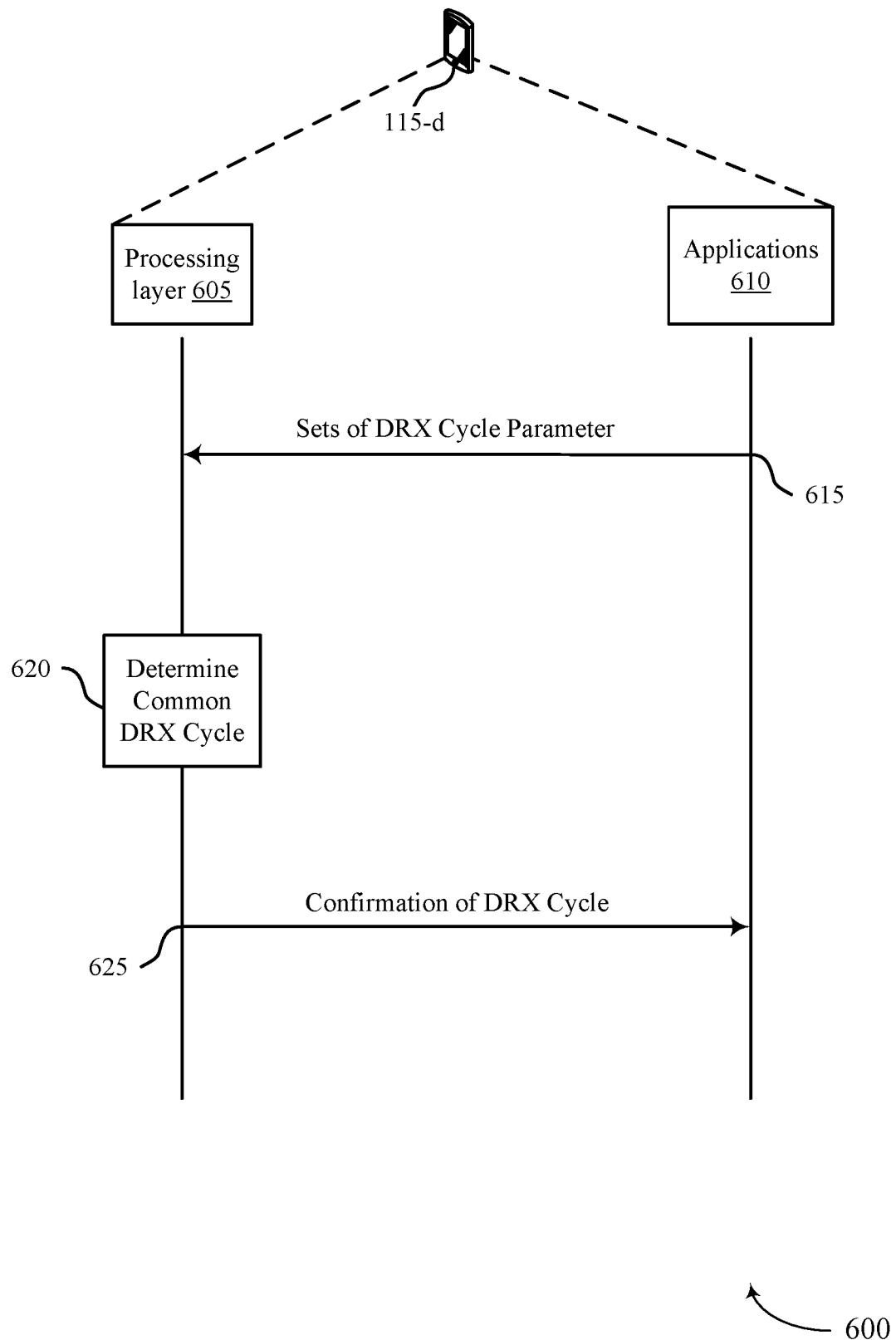

FIG. 6 illustrates an example of a process flow 600 that supports transmission mode cycle alignment in accordance with aspects of the present disclosure. In some examples, process flow 600 may implement aspects of wireless communications system 100 and 200, as well as protocol stacks 300 and 400. UE 115-*d* may be an example of a UE 115 as described in reference to FIGS. 1-5. UE 115-*d* may include processing layer 605, and applications 610. Processing layer 605 may be an example of V2X layer 305 or 405. Applications 610 may be one or more applications, such as one or more V2X applications 310 or one or more V2X applications 410.

At 615, UE 115-*d* may receive, at processing layer 605, a number of sets of DRX cycle parameters from a corresponding set of applications 610 at an application layer of UE 115-*d*. The processing layer may be below the application layer and above a user plane protocol stack of UE 115-*d*.

In some cases, processing layer 605 may be a sidelink layer. The sidelink layer may include a V2X layer. In this case, at 615, processing layer may receive each of the sets of DRX cycle parameters via a respective DRX cycle request from a corresponding application 610. The request may include an indication of service requirements of corresponding applications 610.

At 620, UE 115-*d* may determine, based on the number of sets of DRX cycle parameters, a common DRX cycle to satisfy each of the set of applications 610. UE 115-*d* may determine a common set of DRX cycle parameters that satisfy either individual DRX cycles associated with the number of sets of DRX cycle parameters or adjusted DRX cycles associated with adjusted sets of DRX cycle parameters. In cases where the processing layer 605 is a sidelink layer, processing layer 605 may determine an initial common DRX cycle based on the number of sets of DRX cycle parameters.

In some cases, processing layer 605 may determine that the initial common DRX cycle fails to satisfy at least one of the set of applications 610. Processing layer 605 may transmit a request to the at least one of the set of applications to update respective sets of DRX cycle parameters such that the initial common DRX cycle satisfies the at least one of the set of applications 610.

Processing layer 605 may receive a confirmation from the at least one of the set of applications 610 that the respective sets of DRX parameters had been updated such that the initial common DRX cycle satisfied the at least one of the set of applications. Processing layer 605 may determine, based on the confirmation, that the common DRX cycle includes the initial common DRX cycle.

Further, processing layer 605 may receive a response from the at least one of the set of applications 610 that the respective sets of DRX cycle parameters may not be updated. Processing layer 610 may adjust, based on the response, the initial common DRX cycle to an adjusted common DRX cycle. Processing layer 610 may transmit a request to the at least one of the set of applications 610 to update respective sets of DRX cycle parameters such that the adjusted common DRX cycle satisfies the at least one of the set of applications. Processing layer 605 may receive a confirmation from the at least one of the set of applications that the respective sets of DRX cycle parameters had been updated such that the adjusted common DRX cycle satisfied the at least one or the set of applications. Processing layer 605 may determine, based on the confirmation, that the common DRX cycle includes the adjusted common DRX cycle.

In other cases, the processing layer 605 may be a set of middleware layers. The set of middleware layers may include one or more of a V2X application enabler (VAE) layer, or a service enabler architecture layer (SEAL) or both. Processing layer 605 may receive individual sets of DRX parameters at respective middleware layers of the set of middleware layers from respective applications 610 of the set of applications 610. At 620, processing layer 605 may determine the common DRX cycle by negotiating the common DRX cycle between the set of application 610 via the respective middleware layers of the set of middleware layers. The common DRX cycle may be determined based on the negotiating. Negotiating the common DRX cycle may further include determining the common DRX cycle so as to improve power saving efficiency for UE 115-*d*, and so as to distribute channel load between the set of application 610.

At 625, UE 115-*d* may transmit the common DRX cycle to one or more layers in the user plane protocol stack of UE 115-*d*. At 625, in cases where processing layer 605 is a V2X layer, processing layer 605 may transmit, to one or more of the set of applications, a confirmation of the common DRX cycle. At 625, in cases where processing layer 605 is a set of middleware layers, processing layer 605 may transmit the common DRX to the sidelink layer for transmission to the one or more layers in the user plane protocol stack of UE 115-*d*.

UE 115-*d* may communicate with one or more other wireless communication devices in accordance with the common DRX cycle. For example UE 115-*d* may be a vehicle in a V2X communication system, and may communicate with other vehicles of sidelink channels based on the common DRX cycle. UE 115-*d* may also communicate over different RATs, or using unicast or broadcast-type transmissions or a combination of these, using the common DRX cycle.

Figure 7:
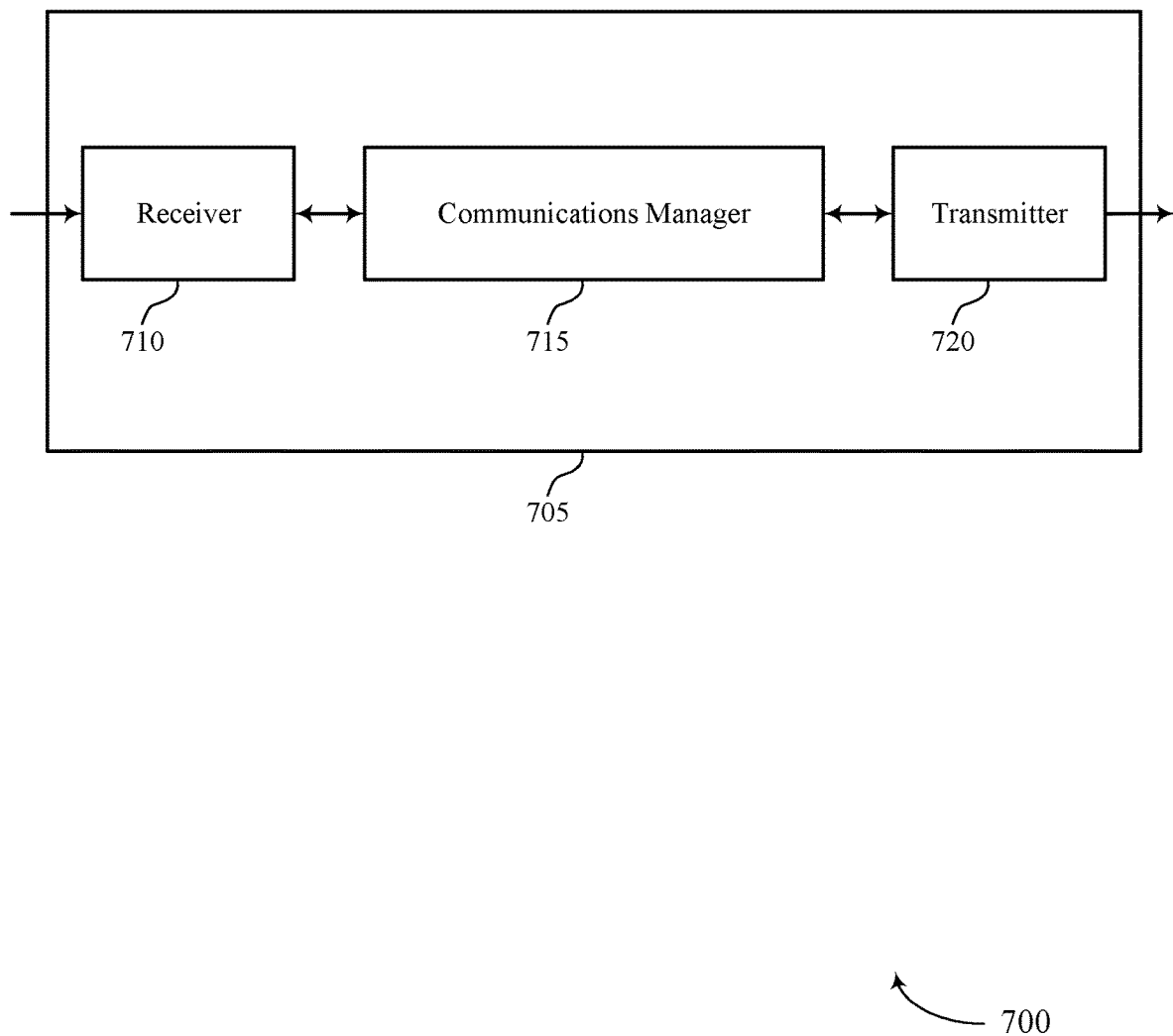
FIGS. 7 and 8 show block diagrams of devices that support transmission mode cycle alignment in accordance with aspects of the present disclosure.

FIG. 7 shows a block diagram 700 of a device 705 that supports transmission mode cycle alignment in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to transmission mode cycle alignment, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, at a processing layer of the UE, a set of sets of DRX cycle parameters from a corresponding set of applications at an application layer of the UE, where the processing layer is below the application layer and above a user plane protocol stack of the UE, determine, based on the set of sets of DRX cycle parameters, a common DRX cycle to satisfy each of the set of applications, and transmit the common DRX cycle to one or more layers in the user plane protocol stack of the UE. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver. For example, the transmitter 720 may be an example of aspects of the transceiver 1020 described with reference to FIG. 10. The transmitter 720 may utilize a single antenna or a set of antennas.

In some examples, the communications manager 715 described herein may be implemented as a chipset of a wireless modem, and the receiver 710 and the transmitter 720 may be implemented as sets of analog components (e.g., amplifiers, filters, phase shifters, antennas, etc.) The wireless modem may obtain and decode signals from the receiver 710 over a receive interface, and may output signals for transmission to the transmitter 720 over a transmit interface.

The actions performed by the communications manager 715 as described herein may be implemented to realize one or more potential advantages. One implementation may allow a UE 115 to save power and increase battery life by aligning DRX cycles of different systems of the UE 115. This may therefore decrease the amount of time spent by different applications of the UE 115 monitoring channels, which may therefore save power.

Figure 8:
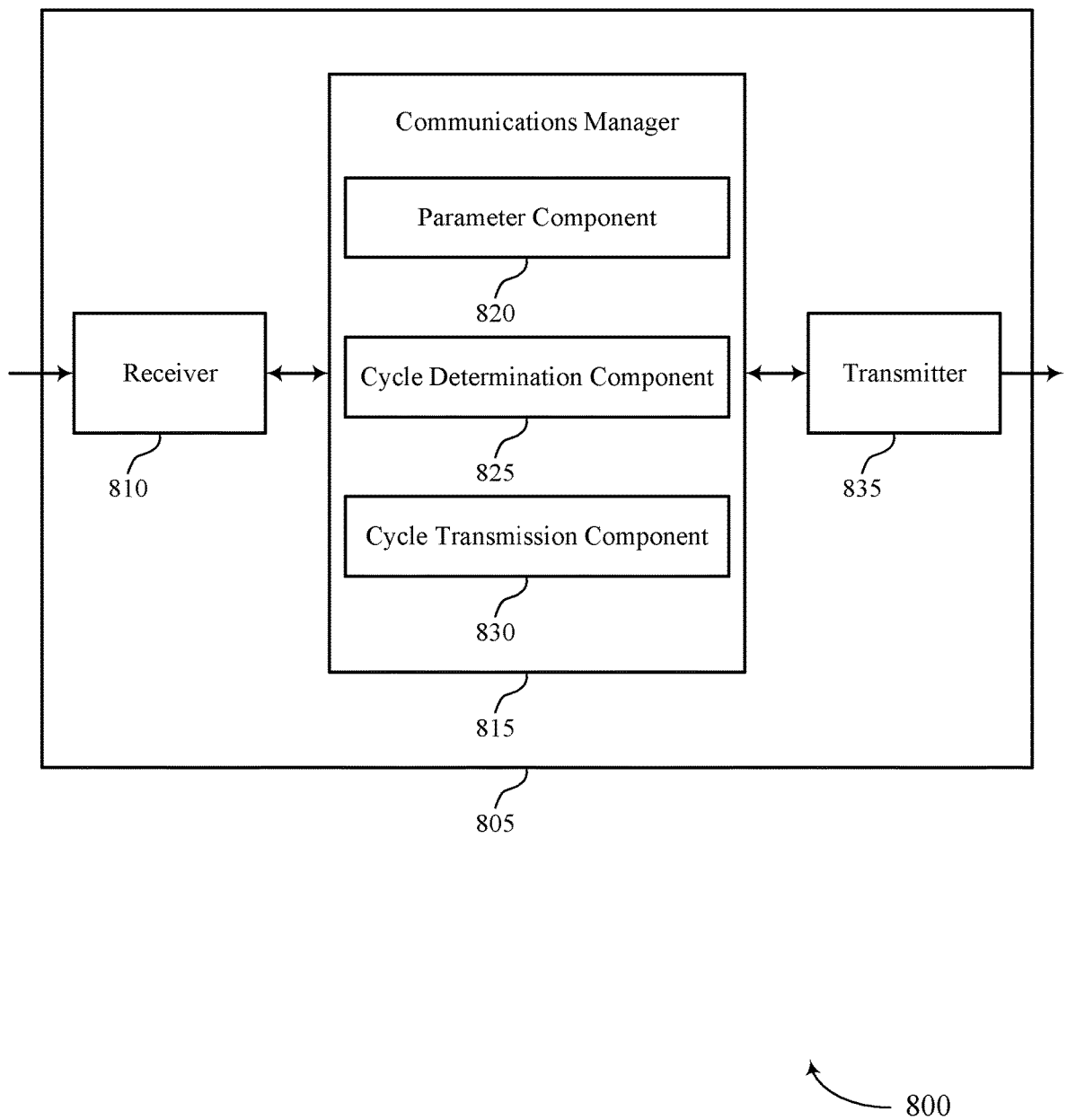

FIG. 8 shows a block diagram 800 of a device 805 that supports transmission mode cycle alignment in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to transmission mode cycle alignment, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a parameter component 820, a cycle determination component 825, and a cycle transmission component 830. The communications manager 815 may be an example of aspects of the communications manager 1010 described herein.

The parameter component 820 may receive, at a processing layer of the UE, a set of sets of DRX cycle parameters from a corresponding set of applications at an application layer of the UE, where the processing layer is below the application layer and above a user plane protocol stack of the UE.

The cycle determination component 825 may determine, based on the set of sets of DRX cycle parameters, a common DRX cycle to satisfy each of the set of applications.

The cycle transmission component 830 may transmit the common DRX cycle to one or more layers in the user plane protocol stack of the UE.

The transmitter 835 may transmit signals generated by other components of the device 805. In some examples, the transmitter 835 may be collocated with a receiver 810 in a transceiver. For example, the transmitter 835 may be an example of aspects of the transceiver 1020 described with reference to FIG. 10. The transmitter 835 may utilize a single antenna or a set of antennas.

A processor of a UE 115 (e.g., controlling the receiver 810, the transmitted 835, or the transceiver 1020 as described with reference to FIG. 10) may save power by aligning DRX cycles used by different applications and services of the UE 115. This may improve efficiency of the UE 115, as the processor of the UE 115 decreases the amount of unnecessary "always-on" time of the UE 115, thereby saving power while maintaining reliability and service capabilities of the UE 115.

Figure 9:
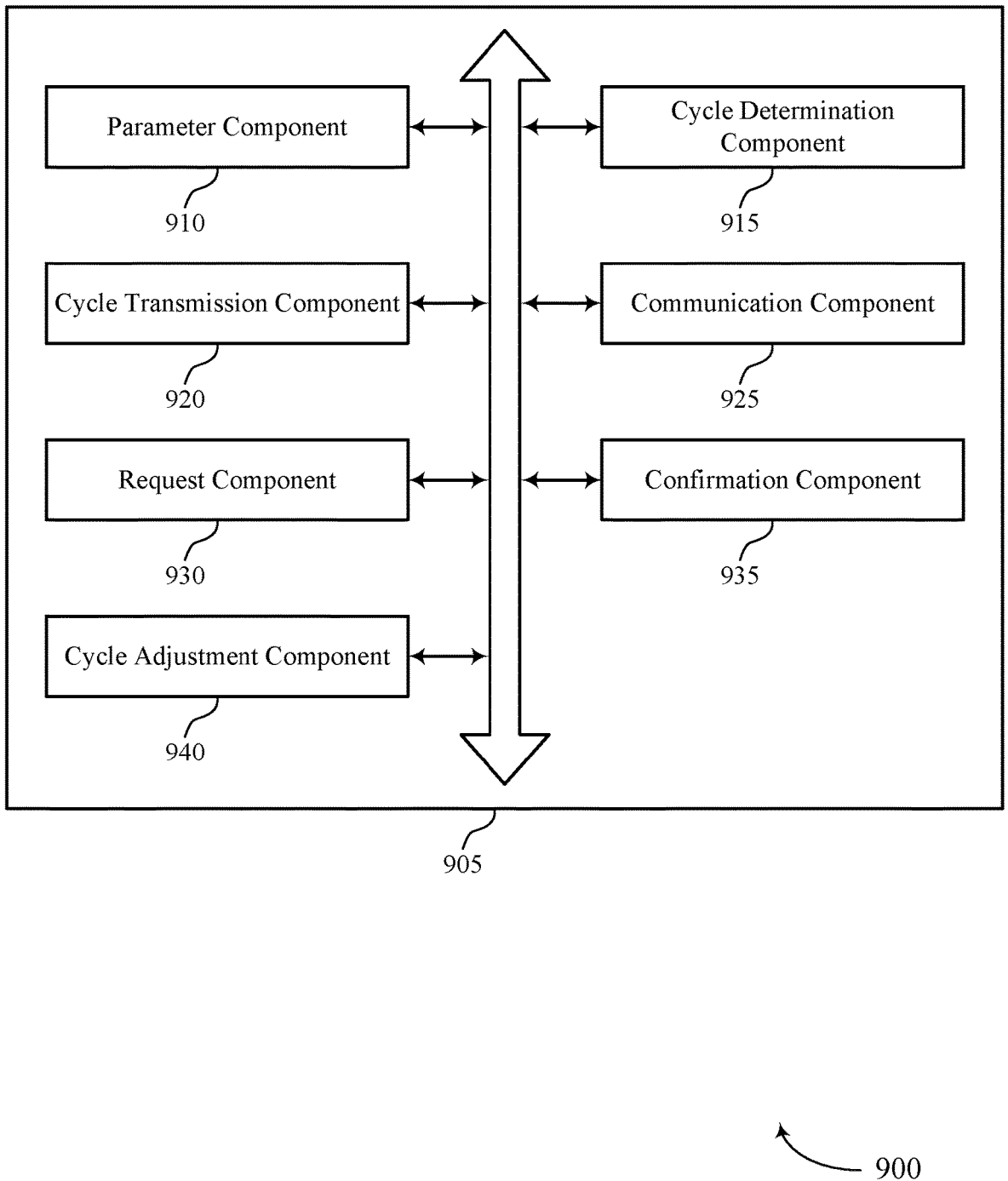
FIG. 9 shows a block diagram of a communications manager that supports transmission mode cycle alignment in accordance with aspects of the present disclosure.

FIG. 9 shows a block diagram 900 of a communications manager 905 that supports transmission mode cycle alignment in accordance with aspects of the present disclosure. The communications manager 905 may be an example of aspects of a communications manager 715, a communications manager 815, or a communications manager 1010 described herein. The communications manager 905 may include a parameter component 910, a cycle determination component 915, a cycle transmission component 920, a communication component 925, a request component 930, a confirmation component 935, and a cycle adjustment component 940. Each of these components may communicate, directly or indirectly, with one another (e.g., via one or more buses).

The parameter component 910 may receive, at a processing layer of the UE, a set of sets of DRX cycle parameters from a corresponding set of applications at an application layer of the UE, where the processing layer is below the application layer and above a user plane protocol stack of the UE.

In some examples, the parameter component 910 may receive a response from the at least one of the set of applications that the respective sets of DRX cycle parameters would not be updated.

In some examples, the parameter component 910 may receive individual sets of DRX cycle parameters at respective middleware layers of the set of middleware layers from respective applications of the set of applications.

In some examples, the parameter component 910 may receive an indication of an additional set of DRX cycle parameters from a base station, where the additional set of DRX cycle parameters pertains to communications between the UE and the base station, and where determining the common DRX cycle is further based on the indication.

In some examples, the parameter component 910 may receive an indication of an additional set of DRX cycle parameters from a base station, where the additional set of DRX cycle parameters pertains to communications between the UE and the base station.

In some examples, the parameter component 910 may transmit a request, to the base station, for an updated set of additional DRX cycle parameters that are satisfied by the common DRX cycle.

In some examples, the parameter component 910 may transmit the request in a RRC reconfiguration message.

In some examples, the parameter component 910 may transmit a request to a base station for an additional set of uplink DRX cycle parameters that are satisfied by the common DRX cycle.

In some examples, the parameter component 910 may transmit the request in a RRC configuration request.

In some cases, the set of middleware layers includes one or more of a vehicle-to-everything application enabler layer or a service enabler architecture layer for verticals, or both.

In some cases, the request includes an alignment indicator that indicates whether an additional DRX cycle associated with the additional set of DRX cycle parameters is to align with the common DRX cycle.

In some cases, the request includes a flexibility indicator that indicates whether the UE is flexible in modifying the common DRX cycle.

In some cases, the request includes an indication of a sidelink traffic pattern, an explicit indication of the common DRX cycle, or a combination thereof.

The cycle determination component 915 may determine, based on the set of sets of DRX cycle parameters, a common DRX cycle to satisfy each of the set of applications.

In some examples, the cycle determination component 915 may determine a common set of DRX cycle parameters that satisfy either individual DRX cycles associated with the set of sets of DRX cycle parameters or adjusted DRX cycles associated with adjusted sets of DRX cycle parameters.

In some examples, the cycle determination component 915 may determine an initial common DRX cycle based on the set of sets of DRX cycle parameters.

In some examples, the cycle determination component 915 may determine that the initial common DRX cycle fails to satisfy at least one of the set of applications.

In some examples, determining, based on the confirmation, that the common DRX cycle includes the initial common DRX cycle.

In some examples, determining, based on the confirmation, that the common DRX cycle includes the adjusted common DRX cycle.

In some examples, the cycle determination component 915 may negotiate the common DRX cycle between the set of applications via respective middleware layers of the set of middleware layers.

In some examples, the cycle determination component 915 may determine the common DRX cycle based on the negotiating.

In some examples, the cycle determination component 915 may determine the common DRX cycle so as to improve power saving efficiency for the UE and so as to distribute channel load between the set of applications.

In some examples, the cycle determination component 915 may determine that the common DRX cycle does not satisfy the additional set of DRX cycle parameters.

The cycle transmission component 920 may transmit the common DRX cycle to one or more layers in the user plane protocol stack of the UE.

In some examples, the cycle transmission component 920 may transmit the common DRX cycle to the sidelink layer for transmission to the one or more layers in the user plane protocol stack of the UE.

The communication component 925 may communicate, by the UE, with one or more other wireless communication devices in accordance with the common DRX cycle.

The request component 930 may receive each of the set of sets of DRX cycle parameters via a respective DRX cycle request from a corresponding application.

In some examples, the request component 930 may transmit a request to the at least one of the set of applications to update respective sets of DRX cycle parameters such that the initial common DRX cycle satisfies the at least one of the set of applications.

In some examples, the request component 930 may transmit a request to the at least one of the set of applications to update respective sets of DRX cycle parameters such that the adjusted common DRX cycle satisfies the at least one of the set of applications.

In some cases, the respective DRX cycle requests include an indication of service requirements of corresponding applications.

In some cases, the sidelink layer includes a vehicle-to-everything layer.

The confirmation component 935 may receive a confirmation from the at least one of the set of applications that the respective sets of DRX cycle parameters had been updated such that the initial common DRX cycle satisfied the at least one of the set of applications.

In some examples, the confirmation component 935 may receive a confirmation from the at least one of the set of applications that the respective sets of DRX cycle parameters had been updated such that the adjusted common DRX cycle satisfied the at least one of the set of applications.

In some examples, the confirmation component 935 may transmit, to one or more of the set of applications, a confirmation of the common DRX cycle.

The cycle adjustment component 940 may adjust, based on the response, the initial common DRX cycle to an adjusted common DRX cycle.

Figure 10:
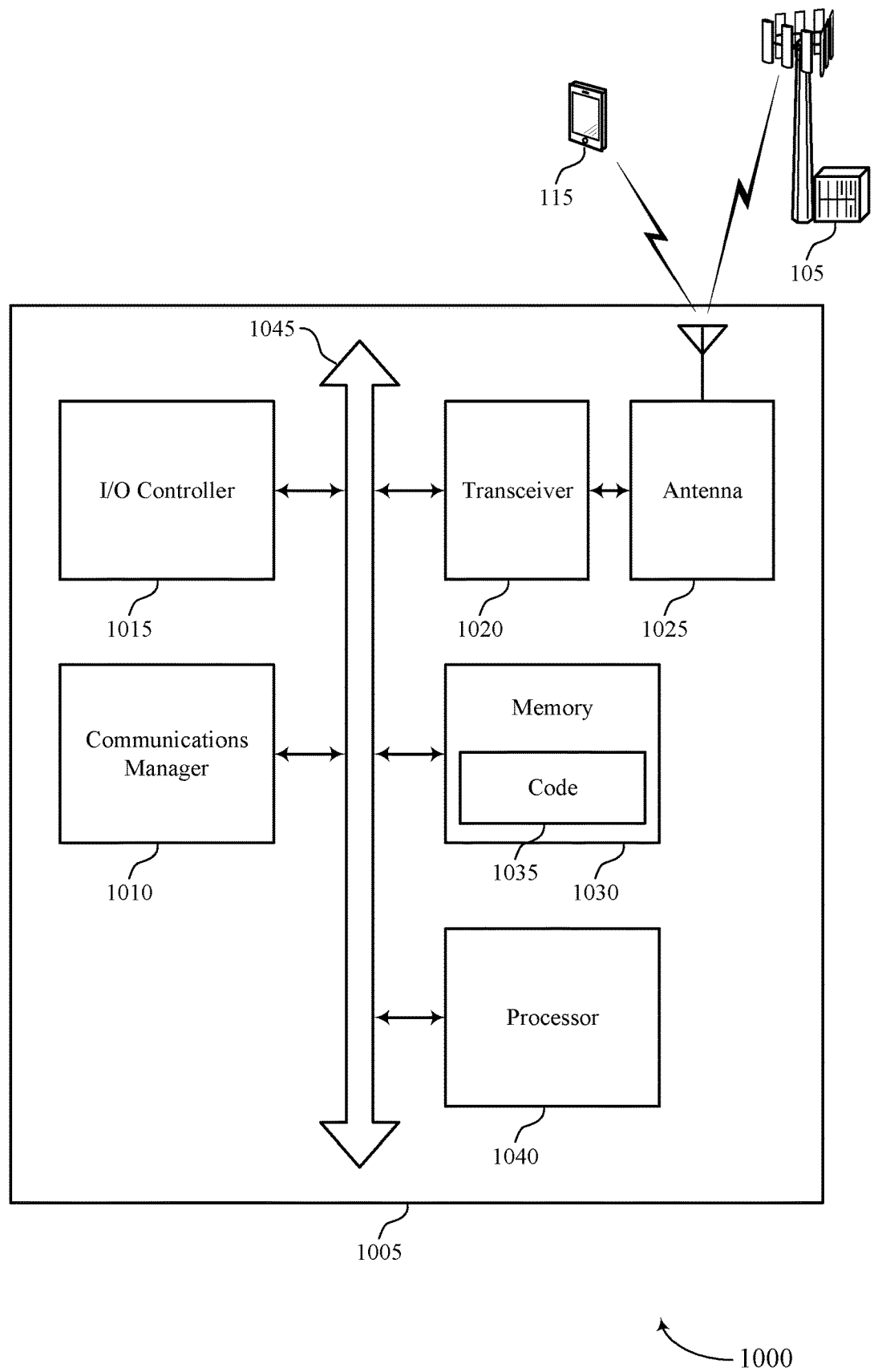
FIG. 10 shows a diagram of a system including a device that supports transmission mode cycle alignment in accordance with aspects of the present disclosure.

FIG. 10 shows a diagram of a system 1000 including a device 1005 that supports transmission mode cycle alignment in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, at a processing layer of the UE, a set of sets of DRX cycle parameters from a corresponding set of applications at an application layer of the UE, where the processing layer is below the application layer and above a user plane protocol stack of the UE, determine, based on the set of sets of DRX cycle parameters, a common DRX cycle to satisfy each of the set of applications, and transmit the common DRX cycle to one or more layers in the user plane protocol stack of the UE.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting transmission mode cycle alignment).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
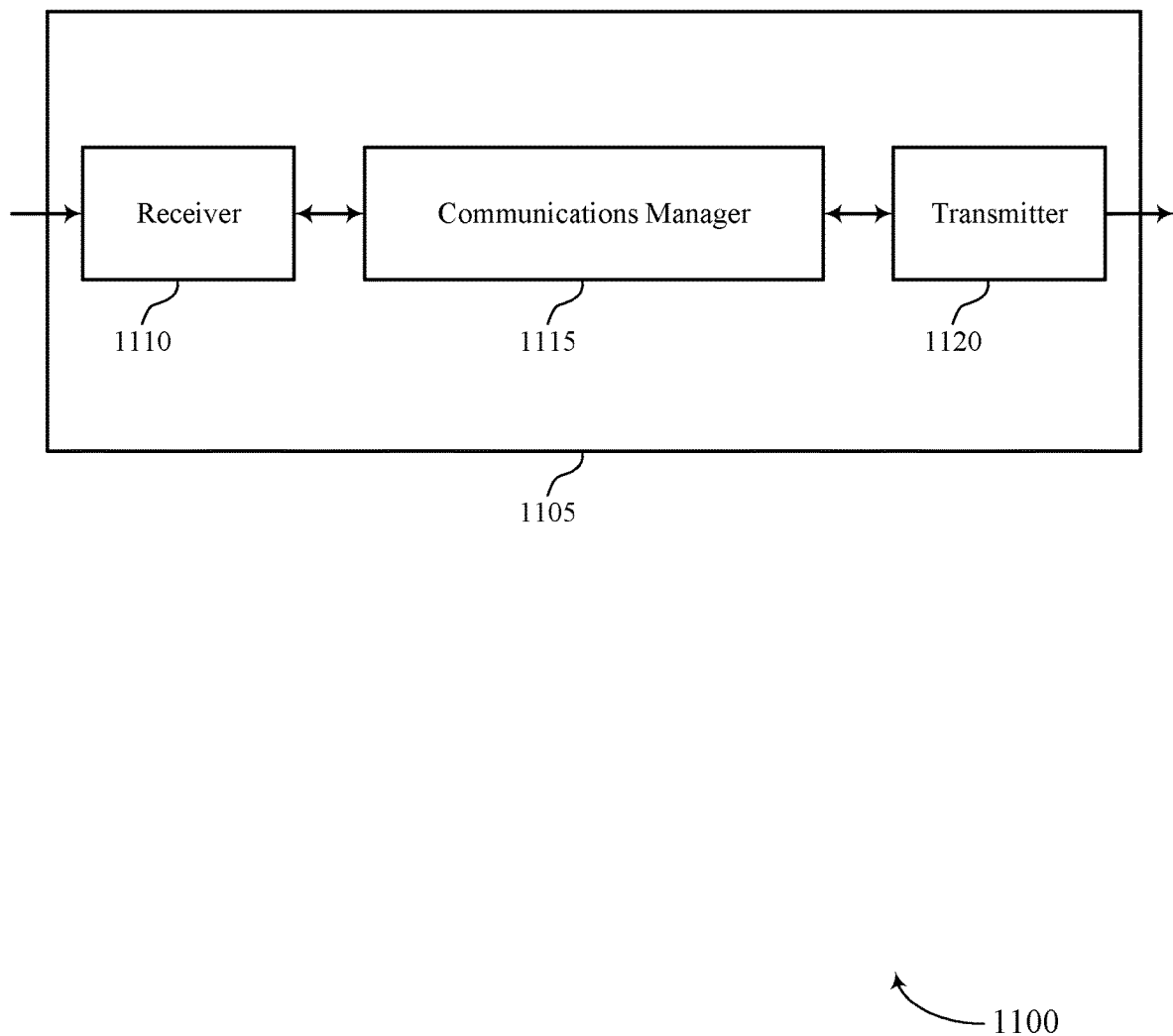
FIGS. 11 and 12 show block diagrams of devices that support transmission mode cycle alignment in accordance with aspects of the present disclosure.

FIG. 11 shows a block diagram 1100 of a device 1105 that supports transmission mode cycle alignment in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to transmission mode cycle alignment, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive a request, from a UE, for a set of DRX cycle parameters that satisfies a common DRX cycle of the UE, transmit, to the UE, an indication of the set of DRX cycle parameters in response to the request, and receive, from the UE, a confirmation of a DRX cycle associated with the set of DRX cycle parameters. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver. For example, the transmitter 1120 may be an example of aspects of the transceiver 1420 described with reference to FIG. 14. The transmitter 1120 may utilize a single antenna or a set of antennas.

Figure 12:
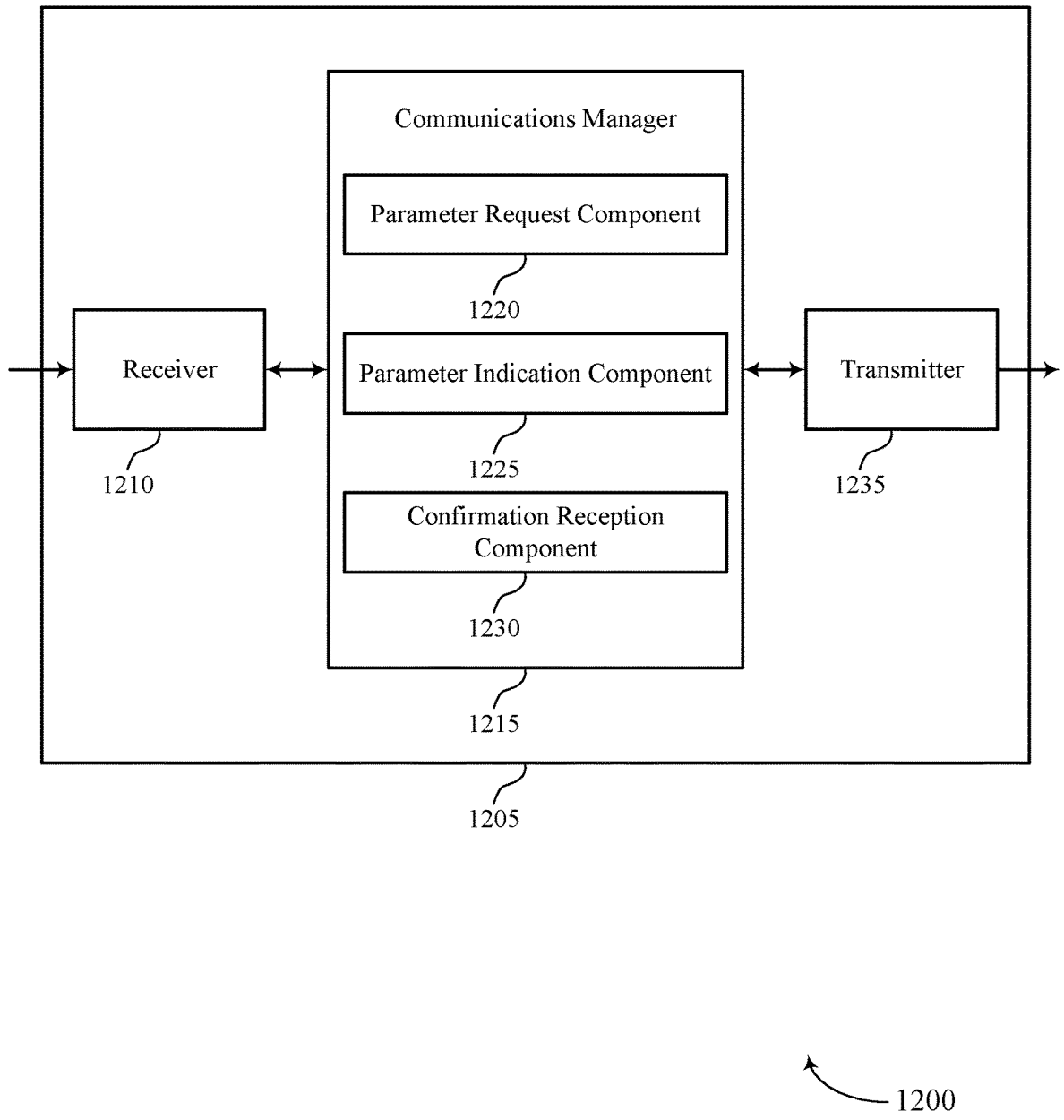

FIG. 12 shows a block diagram 1200 of a device 1205 that supports transmission mode cycle alignment in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to transmission mode cycle alignment, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a parameter request component 1220, a parameter indication component 1225, and a confirmation reception component 1230. The communications manager 1215 may be an example of aspects of the communications manager 1410 described herein.

The parameter request component 1220 may receive a request, from a UE, for a set of DRX cycle parameters that satisfies a common DRX cycle of the UE.

The parameter indication component 1225 may transmit, to the UE, an indication of the set of DRX cycle parameters in response to the request.

The confirmation reception component 1230 may receive, from the UE, a confirmation of a DRX cycle associated with the set of DRX cycle parameters.

The transmitter 1235 may transmit signals generated by other components of the device 1205. In some examples, the transmitter 1235 may be collocated with a receiver 1210 in a transceiver. For example, the transmitter 1235 may be an example of aspects of the transceiver 1420 described with reference to FIG. 14. The transmitter 1235 may utilize a single antenna or a set of antennas.

Figure 13:
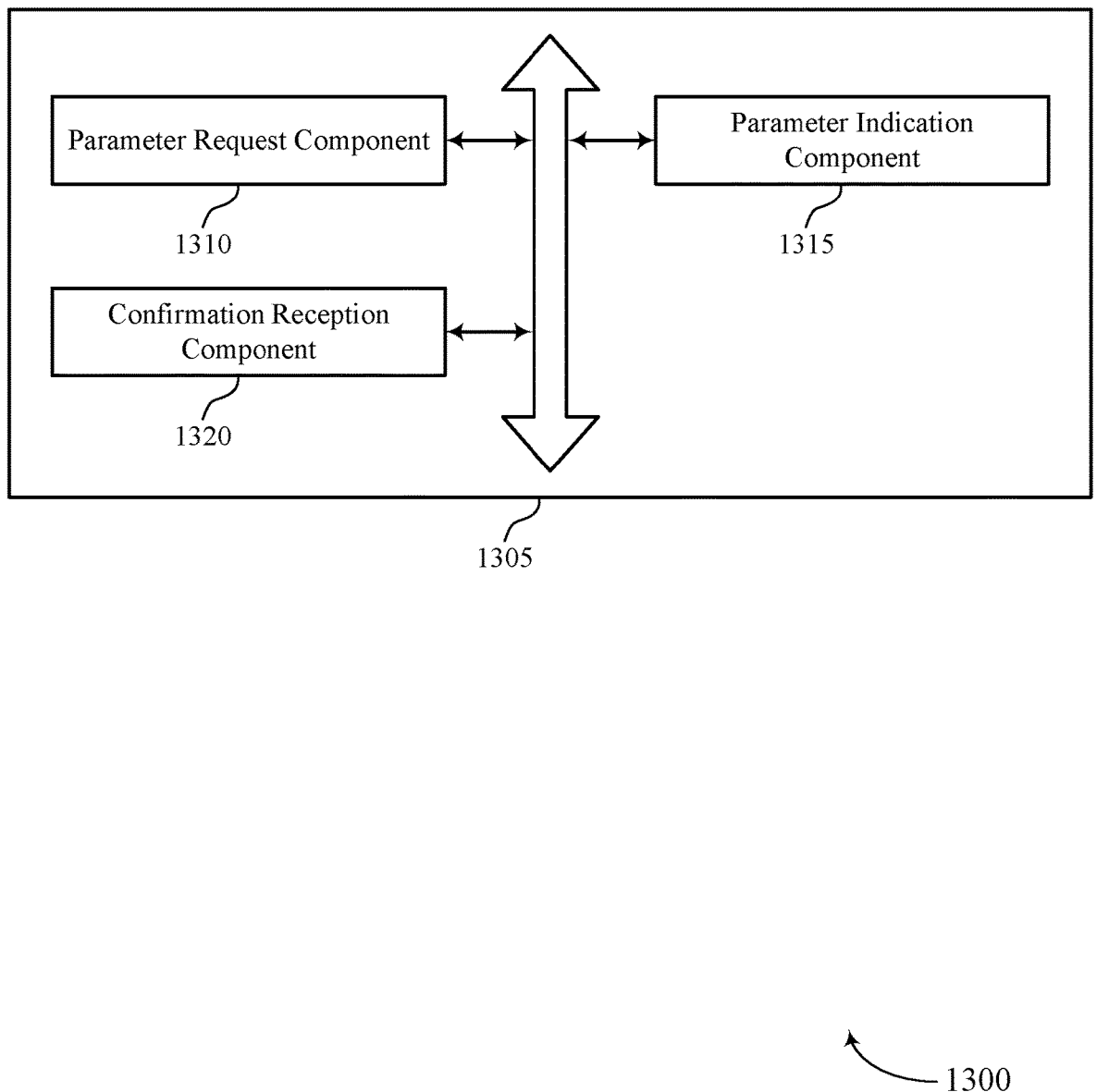
FIG. 13 shows a block diagram of a communications manager that supports transmission mode cycle alignment in accordance with aspects of the present disclosure.

FIG. 13 shows a block diagram 1300 of a communications manager 1305 that supports transmission mode cycle alignment in accordance with aspects of the present disclosure. The communications manager 1305 may be an example of aspects of a communications manager 1115, a communications manager 1215, or a communications manager 1410 described herein. The communications manager 1305 may include a parameter request component 1310, a parameter indication component 1315, and a confirmation reception component 1320. Each of these components may communicate, directly or indirectly, with one another (e.g., via one or more buses).

The parameter request component 1310 may receive a request, from a UE, for a set of DRX cycle parameters that satisfies a common DRX cycle of the UE.

In some examples, the parameter request component 1310 may receive the request in a RRC configuration request.

In some examples, the parameter request component 1310 may receive a request, from the UE, for an updated set of additional DRX cycle parameters that are satisfied by the common DRX cycle.

In some examples, the parameter request component 1310 may receive a request from the UE for an additional set of uplink DRX cycle parameters that are satisfied by the common DRX cycle.

In some cases, the request includes an alignment indicator that indicates whether an additional DRX cycle associated with the additional set of DRX cycle parameters is to align with the common DRX cycle.

In some cases, the request includes a flexibility indicator that indicates whether the UE is flexible in modifying the common DRX cycle.

In some cases, the request includes an indication of a sidelink traffic pattern, an explicit indication of the common DRX cycle, or a combination thereof.

The parameter indication component 1315 may transmit, to the UE, an indication of the set of DRX cycle parameters in response to the request.

In some examples, the parameter indication component 1315 may transmit an indication of an additional set of DRX cycle parameters to the UE, where the additional set of DRX cycle parameters pertains to communications between the UE and the base station.

In some examples, the parameter indication component 1315 may transmit, to the UE, the updated set of additional DRX cycle parameters that are satisfied by the common DRX cycle.

The confirmation reception component 1320 may receive, from the UE, a confirmation of a DRX cycle associated with the set of DRX cycle parameters.

Figure 14:
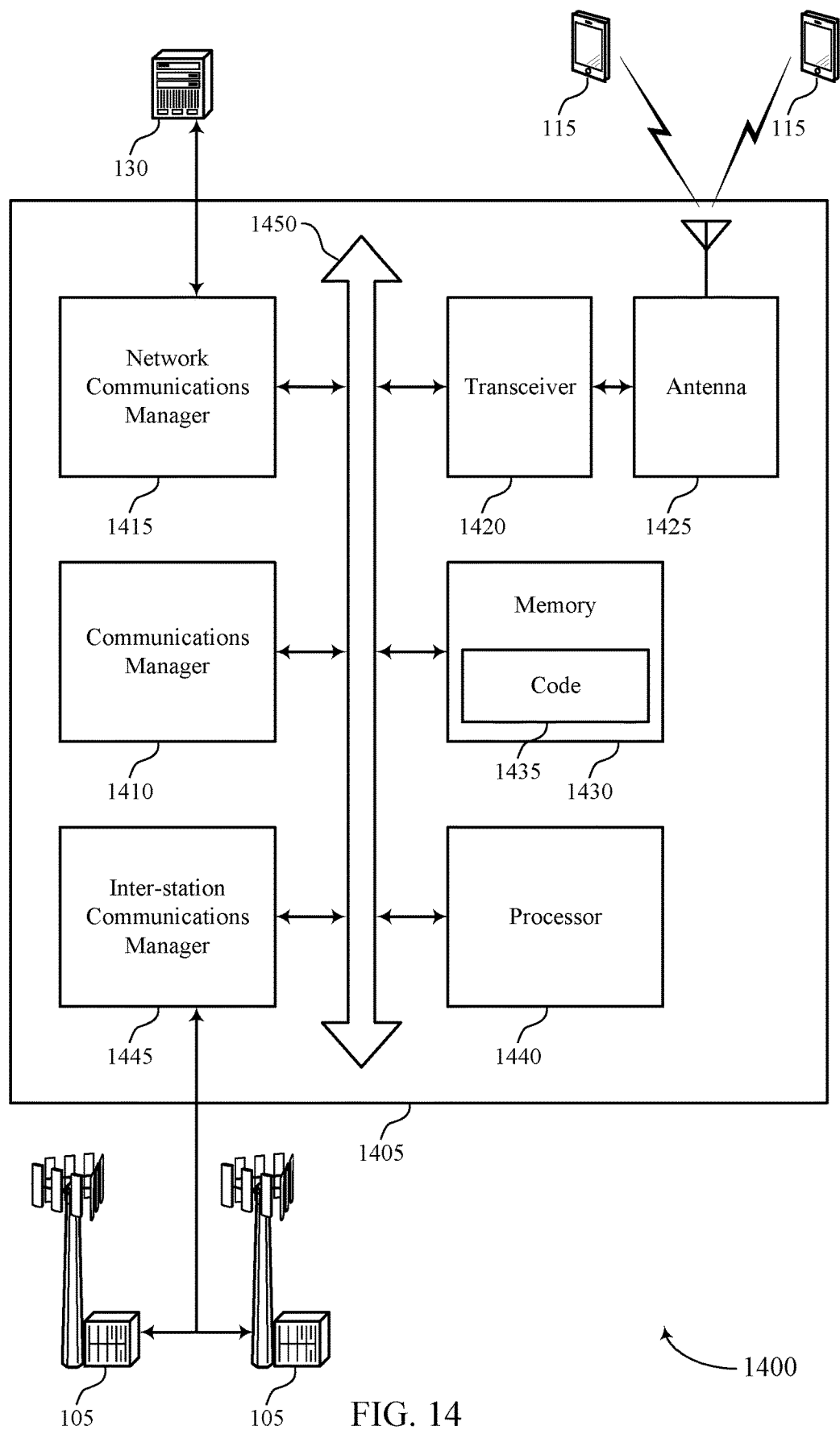
FIG. 14 shows a diagram of a system including a device that supports transmission mode cycle alignment in accordance with aspects of the present disclosure.

FIG. 14 shows a diagram of a system 1400 including a device 1405 that supports transmission mode cycle alignment in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive a request, from a UE, for a set of DRX cycle parameters that satisfies a common DRX cycle of the UE, transmit, to the UE, an indication of the set of DRX cycle parameters in response to the request, and receive, from the UE, a confirmation of a DRX cycle associated with the set of DRX cycle parameters.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting transmission mode cycle alignment).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
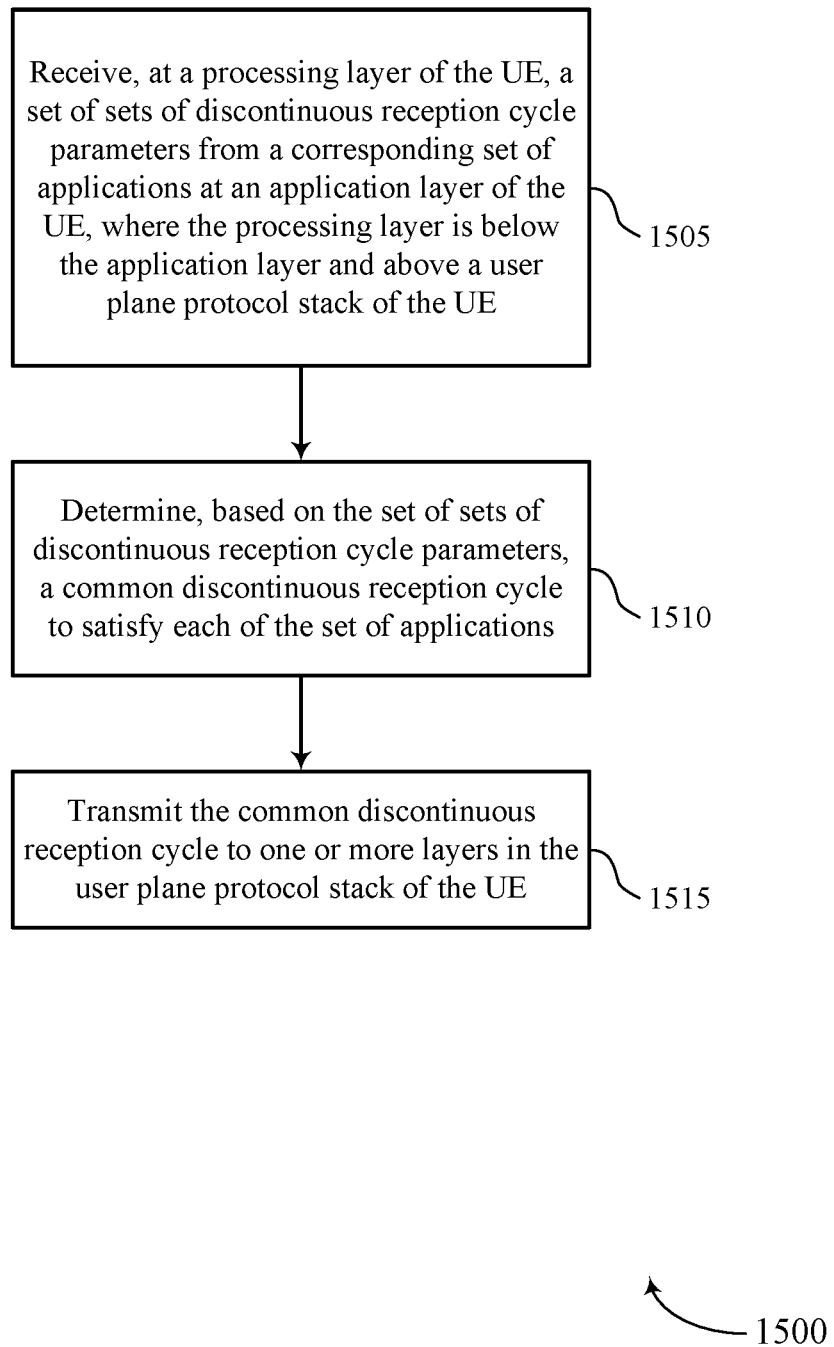
FIGS. 15 through 18 show flowcharts illustrating methods that support transmission mode cycle alignment in accordance with aspects of the present disclosure.

FIG. 15 shows a flowchart illustrating a method 1500 that supports transmission mode cycle alignment in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, at a processing layer of the UE, a set of sets of DRX cycle parameters from a corresponding set of applications at an application layer of the UE, where the processing layer is herein the application layer and above a user plane protocol stack of the UE. The operations of 1505 may be performed according to the methods described herein. In some examples, aspects of the operations of 1505 may be performed by a parameter component as described with reference to FIGS. 7 through 10.

At 1510, the UE may determine, based on the set of sets of DRX cycle parameters, a common DRX cycle to satisfy each of the set of applications. The operations of 1510 may be performed according to the methods described herein. In some examples, aspects of the operations of 1510 may be performed by a cycle determination component as described with reference to FIGS. 7 through 10.

At 1515, the UE may transmit the common DRX cycle to one or more layers in the user plane protocol stack of the UE. The operations of 1515 may be performed according to the methods described herein. In some examples, aspects of the operations of 1515 may be performed by a cycle transmission component as described with reference to FIGS. 7 through 10.

Figure 16:
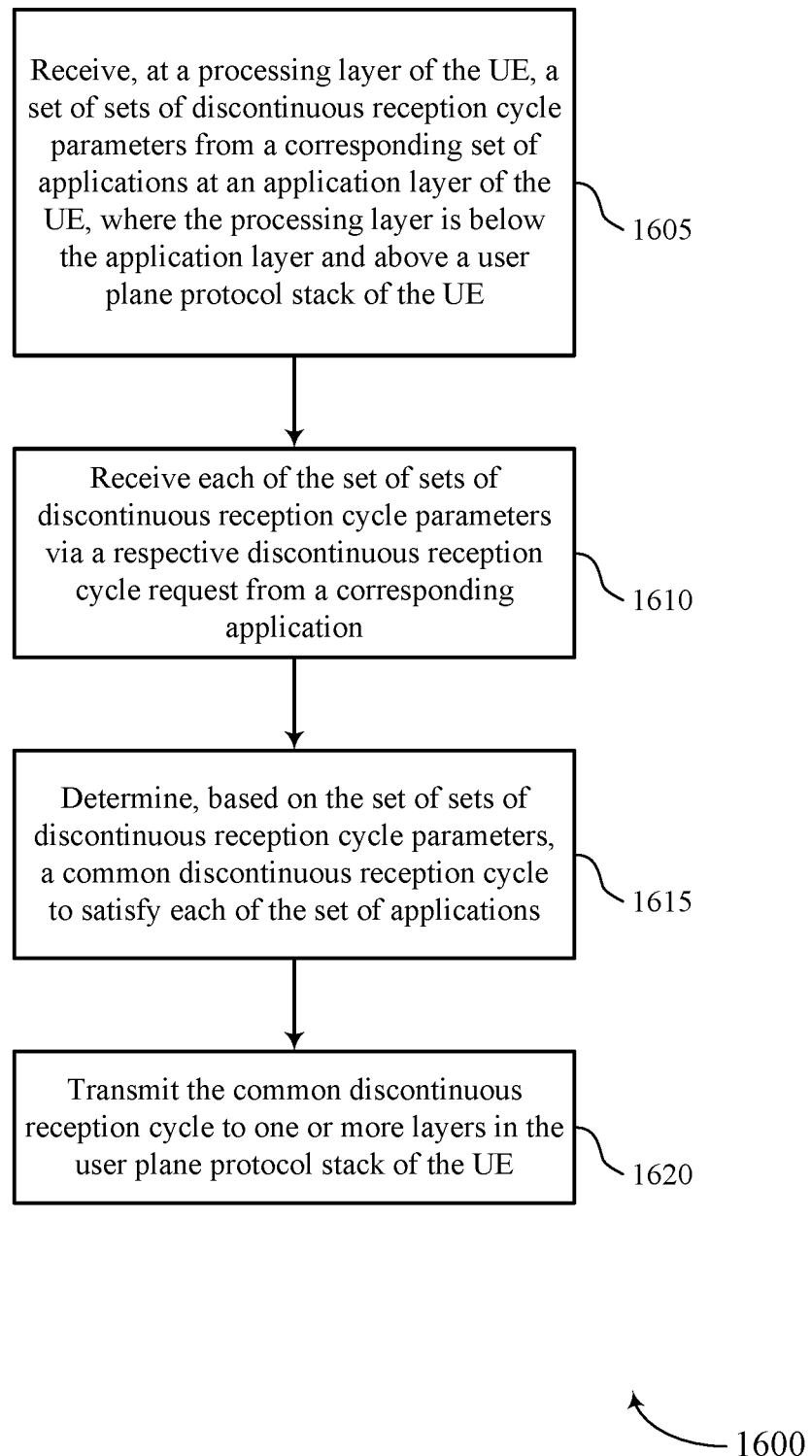

FIG. 16 shows a flowchart illustrating a method 1600 that supports transmission mode cycle alignment in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive, at a processing layer of the UE, a set of sets of DRX cycle parameters from a corresponding set of applications at an application layer of the UE, where the processing layer is below the application layer and above a user plane protocol stack of the UE. The operations of 1605 may be performed according to the methods described herein. In some examples, aspects of the operations of 1605 may be performed by a parameter component as described with reference to FIGS. 7 through 10.

At 1610, the UE may receive each of the set of sets of DRX cycle parameters via a respective DRX cycle request from a corresponding application. The operations of 1610 may be performed according to the methods described herein. In some examples, aspects of the operations of 1610 may be performed by a request component as described with reference to FIGS. 7 through 10.

At 1615, the UE may determine, based on the set of sets of DRX cycle parameters, a common DRX cycle to satisfy each of the set of applications. The operations of 1615 may be performed according to the methods described herein. In some examples, aspects of the operations of 1615 may be performed by a cycle determination component as described with reference to FIGS. 7 through 10.

At 1620, the UE may transmit the common DRX cycle to one or more layers in the user plane protocol stack of the UE. The operations of 1620 may be performed according to the methods described herein. In some examples, aspects of the operations of 1620 may be performed by a cycle transmission component as described with reference to FIGS. 7 through 10.

Figure 17:
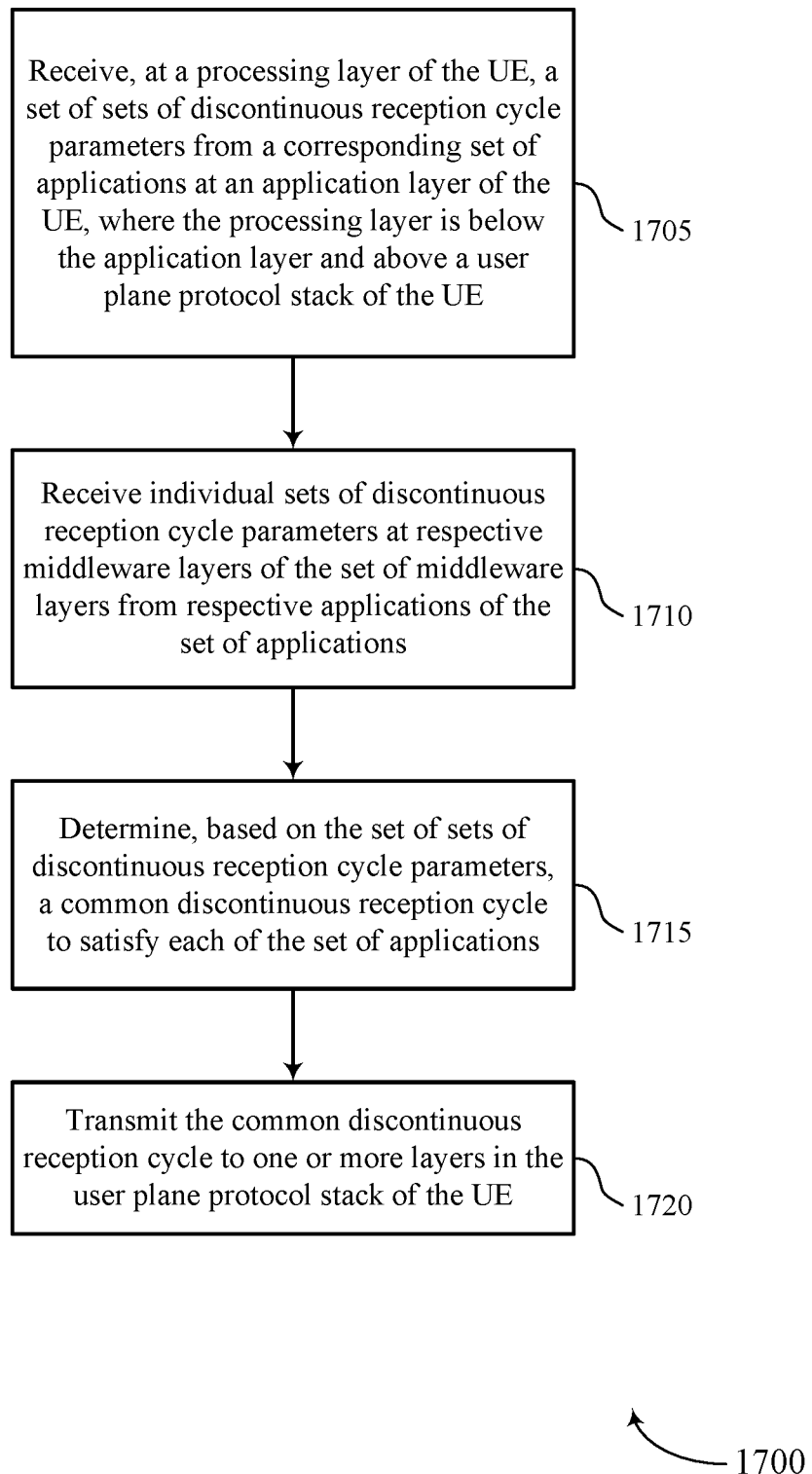

FIG. 17 shows a flowchart illustrating a method 1700 that supports transmission mode cycle alignment in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may receive, at a processing layer of the UE, a set of sets of DRX cycle parameters from a corresponding set of applications at an application layer of the UE, where the processing layer is below the application layer and above a user plane protocol stack of the UE. The operations of 1705 may be performed according to the methods described herein. In some examples, aspects of the operations of 1705 may be performed by a parameter component as described with reference to FIGS. 7 through 10.

At 1710, the UE may receive individual sets of DRX cycle parameters at respective middleware layers of the set of middleware layers from respective applications of the set of applications. The operations of 1710 may be performed according to the methods described herein. In some examples, aspects of the operations of 1710 may be performed by a parameter component as described with reference to FIGS. 7 through 10.

At 1715, the UE may determine, based on the set of sets of DRX cycle parameters, a common DRX cycle to satisfy each of the set of applications. The operations of 1715 may be performed according to the methods described herein. In some examples, aspects of the operations of 1715 may be performed by a cycle determination component as described with reference to FIGS. 7 through 10.

At 1720, the UE may transmit the common DRX cycle to one or more layers in the user plane protocol stack of the UE. The operations of 1720 may be performed according to the methods described herein. In some examples, aspects of the operations of 1720 may be performed by a cycle transmission component as described with reference to FIGS. 7 through 10.

Figure 18:
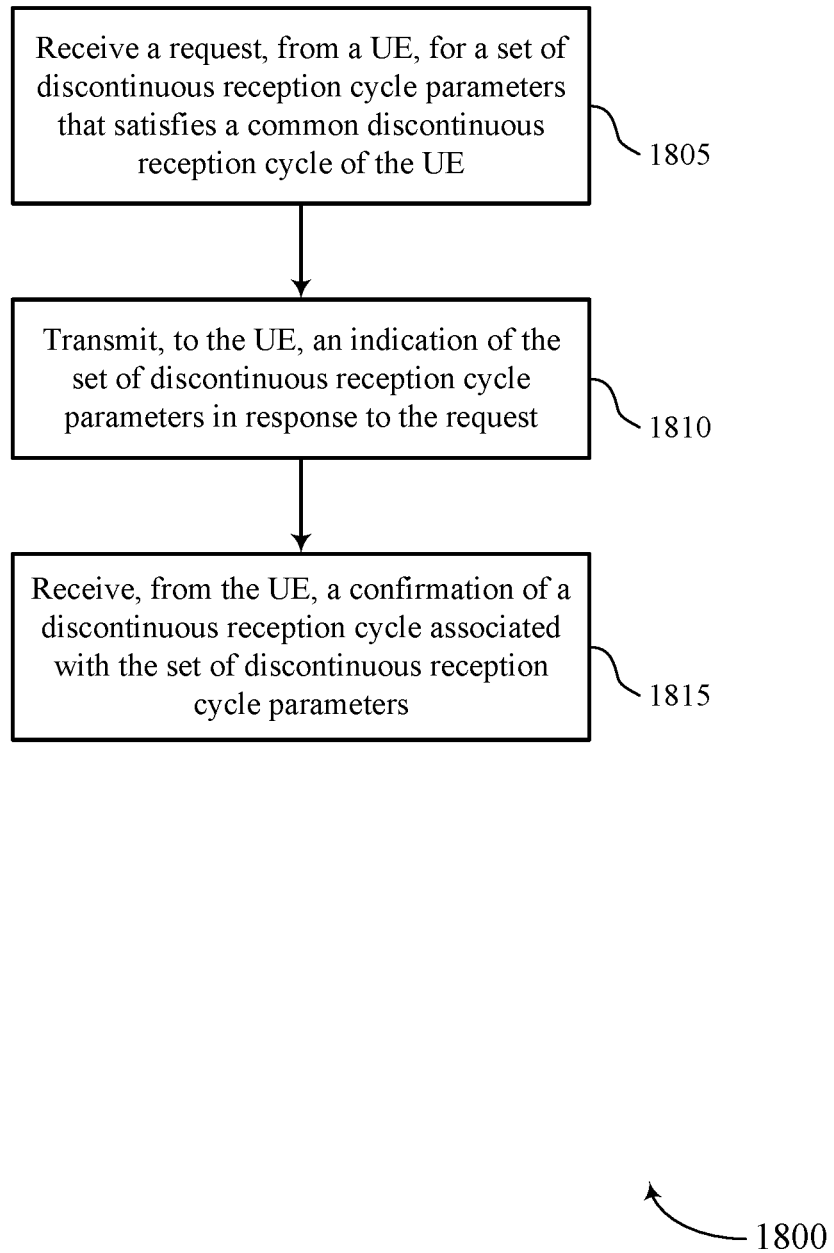

FIG. 18 shows a flowchart illustrating a method 1800 that supports transmission mode cycle alignment in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may receive a request, from a UE, for a set of DRX cycle parameters that satisfies a common DRX cycle of the UE. The operations of 1805 may be performed according to the methods described herein. In some examples, aspects of the operations of 1805 may be performed by a parameter request component as described with reference to FIGS. 11 through 14.

At 1810, the base station may transmit, to the UE, an indication of the set of DRX cycle parameters in response to the request. The operations of 1810 may be performed according to the methods described herein. In some examples, aspects of the operations of 1810 may be performed by a parameter indication component as described with reference to FIGS. 11 through 14.

At 1815, the base station may receive, from the UE, a confirmation of a DRX cycle associated with the set of DRX cycle parameters. The operations of 1815 may be performed according to the methods described herein. In some examples, aspects of the operations of 1815 may be performed by a confirmation reception component as described with reference to FIGS. 11 through 14.

The following provides an overview of aspects of the present disclosure:

Aspect 1: A method for wireless communications at a UE, comprising: receiving, at a processing layer of the UE, a plurality of sets of DRX cycle parameters from a corresponding plurality of applications at an application layer of the UE, wherein the processing layer is below the application layer and above a user plane protocol stack of the UE; determining, based at least in part on the plurality of sets of DRX cycle parameters, a common DRX cycle to satisfy each of the plurality of applications; and transmitting the common DRX cycle to one or more layers in the user plane protocol stack of the UE.

Aspect 2: The method of aspect 1, wherein determining the common DRX cycle comprises: determining a common set of DRX cycle parameters that satisfy either individual DRX cycles associated with the plurality of sets of DRX cycle parameters or adjusted DRX cycles associated with adjusted sets of DRX cycle parameters.

Aspect 3: The method of any of aspects 1 through 2, further comprising: communicating, by the UE, with one or more other wireless communication devices in accordance with the common DRX cycle.

Aspect 4: The method of any of aspects 1 through 3, wherein the processing layer is a sidelink layer, wherein receiving the plurality of sets of DRX cycle parameters from the corresponding plurality of applications comprises:

receiving each of the plurality of sets of DRX cycle parameters via a respective DRX cycle request from a corresponding application.

Aspect 5: The method of aspect 4, wherein determining the common DRX cycle further comprises: determining an initial common DRX cycle based at least in part on the plurality of sets of DRX cycle parameters.

Aspect 6: The method of aspect 5, further comprising: determining that the initial common DRX cycle fails to satisfy at least one of the plurality of applications; and transmitting a request to the at least one of the plurality of applications to update respective sets of DRX cycle parameters such that the initial common DRX cycle satisfies the at least one of the plurality of applications.

Aspect 7: The method of aspect 6, further comprising: receiving a confirmation from the at least one of the plurality of applications that the respective sets of DRX cycle parameters had been updated such that the initial common DRX cycle satisfied the at least one of the plurality of applications; and determining, based at least in part on the confirmation, that the common DRX cycle comprises the initial common DRX cycle.

Aspect 8: The method of any of aspects 6 through 7, further comprising: receiving a response from the at least one of the plurality of applications that the respective sets of DRX cycle parameters would not be updated; adjusting, based at least in part on the response, the initial common DRX cycle to an adjusted common DRX cycle; transmitting a request to the at least one of the plurality of applications to update respective sets of DRX cycle parameters such that the adjusted common DRX cycle satisfies the at least one of the plurality of applications; receiving a confirmation from the at least one of the plurality of applications that the respective sets of DRX cycle parameters had been updated such that the adjusted common DRX cycle satisfied the at least one of the plurality of applications; and determining, based at least in part on the confirmation, that the common DRX cycle comprises the adjusted common DRX cycle.

Aspect 9: The method of any of aspects 5 through 8, further comprising: transmitting, to one or more of the plurality of applications, a confirmation of the common DRX cycle.

Aspect 10: The method of any of aspects 4 through 9, wherein the respective DRX cycle requests comprise an indication of service requirements of corresponding applications.

Aspect 11: The method of any of aspects 4 through 10, wherein the sidelink layer includes a vehicle-to-everything layer.

Aspect 12: The method of any of aspects 1 through 11, wherein the processing layer is a plurality of middleware layers, wherein receiving the plurality of sets of DRX cycle parameters from the corresponding plurality of applications comprises: receiving individual sets of DRX cycle parameters at respective middleware layers of the plurality of middleware layers from respective applications of the plurality of applications.

Aspect 13: The method of aspect 12, wherein determining the common DRX cycle further comprises: negotiating the common DRX cycle between the plurality of applications via respective middleware layers of the plurality of middleware layers; and determining the common DRX cycle based at least in part on the negotiating.

Aspect 14: The method of aspect 13, further comprising: transmitting the common DRX cycle to a sidelink layer for transmission to the one or more layers in the user plane protocol stack of the UE.

Aspect 15: The method of any of aspects 13 through 14, wherein negotiating the common DRX cycle comprises: determining the common DRX cycle so as to improve power saving efficiency for the UE and so as to distribute channel load between the plurality of applications.

Aspect 16: The method of any of aspects 12 through 15, wherein the plurality of middleware layers includes one or more of a vehicle-to-everything application enabler layer or a service enabler architecture layer for verticals, or both.

Aspect 17: The method of any of aspects 1 through 16, further comprising. receiving an indication of an additional set of DRX cycle parameters from a base station, wherein the additional set of DRX cycle parameters pertains to communications between the UE and the base station, and wherein determining the common DRX cycle is further based at least in part on the indication.

Aspect 18: The method of any of aspects 1 through 17, further comprising: receiving an indication of an additional set of DRX cycle parameters from a base station, wherein the additional set of DRX cycle parameters pertains to communications between the UE and the base station; determining that the common DRX cycle does not satisfy the additional set of DRX cycle parameters; and transmitting a request, to the base station, for an updated set of additional DRX cycle parameters that are satisfied by the common DRX cycle.

Aspect 19: The method of aspect 18, wherein transmitting the request comprises: transmitting the request in a RRC reconfiguration message.

Aspect 20: The method of any of aspects 1 through 19, further comprising: transmitting a request to a base station for an additional set of uplink DRX cycle parameters that are satisfied by the common DRX cycle.

Aspect 21: The method of aspect 20, wherein transmitting the request comprises: transmitting the request in a RRC configuration request.

Aspect 22: The method of any of aspects 20 through 21, wherein the request includes an alignment indicator that indicates whether an additional DRX cycle associated with the additional set of uplink DRX cycle parameters is to align with the common DRX cycle.

Aspect 23: The method of any of aspects 20 through 22, wherein the request includes a flexibility indicator that indicates whether the UE is flexible in modifying the common DRX cycle.

Aspect 24: The method of any of aspects 20 through 23, wherein the request includes an indication of a sidelink traffic pattern, an explicit indication of the common DRX cycle, or a combination thereof.

Aspect 25: A method for wireless communications at a base station, comprising: receiving a request, from a UE, for a set of DRX cycle parameters that satisfies a common DRX cycle of the UE; transmitting, to the UE, an indication of the set of DRX cycle parameters in response to the request; and receiving, from the UE, a confirmation of a DRX cycle associated with the set of DRX cycle parameters.

Aspect 26: The method of aspect 25, wherein receiving the request comprises: receiving the request in a RRC configuration request.

Aspect 27: The method of any of aspects 25 through 26, further comprising: transmitting an indication of an additional set of DRX cycle parameters to the UE, wherein the additional set of DRX cycle parameters pertains to communications between the UE and the base station; receiving a request, from the UE, for an updated set of additional DRX cycle parameters that are satisfied by the common DRX cycle; and transmitting, to the UE, the updated set of additional DRX cycle parameters that are satisfied by the common DRX cycle.

Aspect 28: The method of any of aspects 25 through 27, further comprising: receiving a request from the UE for an additional set of uplink DRX cycle parameters that are satisfied by the common DRX cycle.

Aspect 29: The method of aspect 28, wherein the request includes an alignment indicator that indicates whether an additional DRX cycle associated with the additional set of uplink DRX cycle parameters is to align with the common DRX cycle.

Aspect 30: The method of any of aspects 28 through 29, wherein the request includes a flexibility indicator that indicates whether the UE is flexible in modifying the common DRX cycle.

Aspect 31: The method of any of aspects 28 through 30, wherein the request includes an indication of a sidelink traffic pattern, an explicit indication of the common DRX cycle, or a combination thereof.

Aspect 32: An apparatus for wireless communications at a UE, comprising a processor; memory coupled with the processor; and instructions stored in the memory and executable by the processor to cause the apparatus to perform a method of any of aspects 1 through 24.

Aspect 33: An apparatus for wireless communications at a UE, comprising at least one means for performing a method of any of aspects 1 through 24.

Aspect 34: A non-transitory computer-readable medium storing code for wireless communications at a UE, the code comprising instructions executable by a processor to perform a method of any of aspects 1 through 24.

Aspect 35: An apparatus for wireless communications at a base station, comprising a processor; memory coupled with the processor; and instructions stored in the memory and executable by the processor to cause the apparatus to perform a method of any of aspects 25 through 31.

Aspect 36: An apparatus for wireless communications at a base station, comprising at least one means for performing a method of any of aspects 25 through 31.

Aspect 37: A non-transitory computer-readable medium storing code for wireless communications at a base station, the code comprising instructions executable by a processor to perform a method of any of aspects 25 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, at a processing layer of the UE, a plurality of sets of discontinuous reception cycle parameters from a corresponding plurality of applications at an application layer of the UE, wherein the processing layer is below the application layer and above a user plane protocol stack of the UE;
   determining, based at least in part on the plurality of sets of discontinuous reception cycle parameters, a common discontinuous reception cycle to satisfy each of the plurality of applications;
   transmitting a request to a base station for an additional set of uplink discontinuous reception cycle parameters that are satisfied by the common discontinuous reception cycle; and
   transmitting the common discontinuous reception cycle to one or more layers in the user plane protocol stack of the UE.

2. The method of claim 1, wherein determining the common discontinuous reception cycle comprises:
   determining a common set of discontinuous reception cycle parameters that satisfy either individual discontinuous reception cycles associated with the plurality of sets of discontinuous reception cycle parameters or adjusted discontinuous reception cycles associated with adjusted sets of discontinuous reception cycle parameters.

3. The method of claim 1, further comprising:
   communicating, by the UE, with one or more other wireless communication devices in accordance with the common discontinuous reception cycle.

4. The method of claim 1, wherein the processing layer is a sidelink layer, wherein receiving the plurality of sets of discontinuous reception cycle parameters from the corresponding plurality of applications comprises:
   receiving each of the plurality of sets of discontinuous reception cycle parameters via a respective discontinuous reception cycle request from a corresponding application.

5. The method of claim 4, wherein determining the common discontinuous reception cycle further comprises:
   determining an initial common discontinuous reception cycle based at least in part on the plurality of sets of discontinuous reception cycle parameters.

6. The method of claim 5, further comprising:
   determining that the initial common discontinuous reception cycle fails to satisfy at least one of the plurality of applications; and
   transmitting a request to the at least one of the plurality of applications to update respective sets of discontinuous reception cycle parameters such that the initial common discontinuous reception cycle satisfies the at least one of the plurality of applications.

7. The method of claim 6, further comprising:
   receiving a confirmation from the at least one of the plurality of applications that the respective sets of discontinuous reception cycle parameters had been updated such that the initial common discontinuous reception cycle satisfied the at least one of the plurality of applications; and
   determining, based at least in part on the confirmation, that the common discontinuous reception cycle comprises the initial common discontinuous reception cycle.

8. The method of claim 6, further comprising:
   receiving a response from the at least one of the plurality of applications that the respective sets of discontinuous reception cycle parameters would not be updated;
   adjusting, based at least in part on the response, the initial common discontinuous reception cycle to an adjusted common discontinuous reception cycle;
   transmitting a request to the at least one of the plurality of applications to update respective sets of discontinuous reception cycle parameters such that the adjusted common discontinuous reception cycle satisfies the at least one of the plurality of applications;
   receiving a confirmation from the at least one of the plurality of applications that the respective sets of discontinuous reception cycle parameters had been updated such that the adjusted common discontinuous reception cycle satisfied the at least one of the plurality of applications; and
   determining, based at least in part on the confirmation, that the common discontinuous reception cycle comprises the adjusted common discontinuous reception cycle.

9. The method of claim 5, further comprising:
   transmitting, to one or more of the plurality of applications, a confirmation of the common discontinuous reception cycle.

10. The method of claim 4, wherein the respective discontinuous reception cycle requests comprise an indication of service requirements of corresponding applications.

11. The method of claim 4, wherein the sidelink layer includes a vehicle-to-everything layer.

12. The method of claim 1, wherein the processing layer is a plurality of middleware layers, wherein receiving the plurality of sets of discontinuous reception cycle parameters from the corresponding plurality of applications comprises:
   receiving individual sets of discontinuous reception cycle parameters at respective middleware layers of the plurality of middleware layers from respective applications of the plurality of applications.

13. The method of claim 12, wherein determining the common discontinuous reception cycle further comprises:
negotiating the common discontinuous reception cycle between the plurality of applications via respective middleware layers of the plurality of middleware layers; and
determining the common discontinuous reception cycle based at least in part on the negotiating.

14. The method of claim 13, further comprising:
transmitting the common discontinuous reception cycle to a sidelink layer for transmission to the one or more layers in the user plane protocol stack of the UE.

15. The method of claim 13, wherein negotiating the common discontinuous reception cycle comprises:
determining the common discontinuous reception cycle so as to improve power saving efficiency for the UE and so as to distribute channel load between the plurality of applications.

16. The method of claim 12, wherein the plurality of middleware layers includes one or more of a vehicle-to-everything application enabler layer or a service enabler architecture layer for verticals, or both.

17. The method of claim 1, further comprising:
receiving an indication of an additional set of discontinuous reception cycle parameters from a base station, wherein the additional set of discontinuous reception cycle parameters pertains to communications between the UE and the base station, and wherein determining the common discontinuous reception cycle is further based at least in part on the indication.

18. The method of claim 1, further comprising:
receiving an indication of an additional set of discontinuous reception cycle parameters from a base station, wherein the additional set of discontinuous reception cycle parameters pertains to communications between the UE and the base station;
determining that the common discontinuous reception cycle does not satisfy the additional set of discontinuous reception cycle parameters; and
transmitting a request, to the base station, for an updated set of additional discontinuous reception cycle parameters that are satisfied by the common discontinuous reception cycle.

19. The method of claim 18, wherein transmitting the request comprises:
transmitting the request in a radio resource control reconfiguration message.

20. The method of claim 1, wherein transmitting the request comprises:
transmitting the request in a radio resource control configuration request.

21. The method of claim 1, wherein the request includes an alignment indicator that indicates whether an additional discontinuous reception cycle associated with the additional set of uplink discontinuous reception cycle parameters is to align with the common discontinuous reception cycle.

22. The method of claim 1, wherein the request includes a flexibility indicator that indicates whether the UE is flexible in modifying the common discontinuous reception cycle.

23. The method of claim 1, wherein the request includes an indication of a sidelink traffic pattern, an explicit indication of the common discontinuous reception cycle, or a combination thereof.

24. A method for wireless communications at a base station, comprising:
receiving a request, from a user equipment (UE), for a set of discontinuous reception cycle parameters that satisfies a common discontinuous reception cycle of the UE;
transmitting, to the UE, an indication of the set of discontinuous reception cycle parameters in response to the request;
receiving a request from the UE for an additional set of uplink discontinuous reception cycle parameters that are satisfied by the common discontinuous reception cycle; and
receiving, from the UE, a confirmation of a discontinuous reception cycle associated with the set of discontinuous reception cycle parameters.

25. The method of claim 24, wherein receiving the request comprises:
receiving the request in a radio resource control configuration request.

26. The method of claim 24, further comprising:
transmitting an indication of an additional set of discontinuous reception cycle parameters to the UE, wherein the additional set of discontinuous reception cycle parameters pertains to communications between the UE and the base station;
receiving a request, from the UE, for an updated set of additional discontinuous reception cycle parameters that are satisfied by the common discontinuous reception cycle; and
transmitting, to the UE, the updated set of additional discontinuous reception cycle parameters that are satisfied by the common discontinuous reception cycle.

27. An apparatus for wireless communications at a user equipment (UE), comprising:
a processor,
memory coupled with the processor; and
instructions stored in the memory and executable by the processor to cause the apparatus to:
receive, at a processing layer of the UE, a plurality of sets of discontinuous reception cycle parameters from a corresponding plurality of applications at an application layer of the UE, wherein the processing layer is below the application layer and above a user plane protocol stack of the UE;
determine, based at least in part on the plurality of sets of discontinuous reception cycle parameters, a common discontinuous reception cycle to satisfy each of the plurality of applications;
transmit a request to a base station for an additional set of uplink discontinuous reception cycle parameters that are satisfied by the common discontinuous reception cycle; and
transmit the common discontinuous reception cycle to one or more layers in the user plane protocol stack of the UE.

28. An apparatus for wireless communications at a base station, comprising:
a processor,
memory coupled with the processor; and
instructions stored in the memory and executable by the processor to cause the apparatus to:
receive a request, from a user equipment (UE), for a set of discontinuous reception cycle parameters that satisfies a common discontinuous reception cycle of the UE;

transmit, to the UE, an indication of the set of discontinuous reception cycle parameters in response to the request;
receive a request from the UE for an additional set of uplink discontinuous reception cycle parameters that are satisfied by the common discontinuous reception cycle; and
receive, from the UE, a confirmation of a discontinuous reception cycle associated with the set of discontinuous reception cycle parameters.

* * * * *